US006985657B2

(12) United States Patent
Nakagawa

(10) Patent No.: US 6,985,657 B2
(45) Date of Patent: Jan. 10, 2006

(54) ARRAYED WAVEGUIDE WAVELENGTH MULTIPLEXING APPARATUS AND OPTICAL TRANSMITTER

(75) Inventor: Goji Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/064,482

(22) Filed: Feb. 24, 2005

(65) Prior Publication Data

US 2005/0141813 A1 Jun. 30, 2005

Related U.S. Application Data

(63) Continuation of application No. PCT/JP03/02124, filed on Feb. 26, 2003.

(51) Int. Cl.
*G02B 6/00* (2006.01)
*G02B 6/36* (2006.01)
(52) U.S. Cl. .................................. 385/39; 398/118
(58) Field of Classification Search ............... 385/15, 385/16, 24, 37, 39, 147, 3, 7; 398/118, 121, 398/39.42
See application file for complete search history.

(56) References Cited

U.S. PATENT DOCUMENTS

| 6,141,467 | A | 10/2000 | Doerr | 385/24 |
|---|---|---|---|---|
| 6,389,201 | B1 | 5/2002 | Urino | 385/43 |
| 6,400,872 | B1 | 6/2002 | Gehler | 385/39 |
| 2002/0057869 | A1 * | 5/2002 | Kaneko | 385/24 |
| 2002/0064339 | A1 * | 5/2002 | Chiba | 385/24 |
| 2002/0114572 | A1 | 8/2002 | Bouda | 385/43 |
| 2002/0159696 | A1 * | 10/2002 | Yamauchi et al. | 385/37 |

FOREIGN PATENT DOCUMENTS

| EP | 1253449 | 10/2002 |
|---|---|---|
| GB | 2367381 | 4/2002 |
| JP | 5-313029 | * 11/1993 |
| JP | 10-90530 | 4/1998 |
| JP | 11-2733 | 1/1999 |
| JP | 11-344629 | 12/1999 |
| JP | 2000-352630 | 12/2000 |
| JP | 2001-174653 | 6/2001 |
| WO | WO02/052319 | 7/2002 |
| WO | WO02052319 | * 7/2002 |

OTHER PUBLICATIONS

M. R. Amersfoort, et al., "Phased Array Wavelength Demultiplexer With Flattened Wavelength Response", Electronics Letters, vol. 30, No. 4, pp. 300-302, Feb. 17, 1994.

* cited by examiner

*Primary Examiner*—Akm Enayet Ullah
(74) *Attorney, Agent, or Firm*—Staas & Halsey LLP

(57) ABSTRACT

For a WDM optical communication, on a substrate of an arrayed waveguide type wavelength multiplexing/demultiplexing device, input waveguide propagates a plurality of light and outputs WDM light; a first slab diffuses the WDM light outputted from the input waveguide; a channel waveguide array separates the WDM light and causes the separated six lights to propagate; a second slab condenses the separated six lights having propagated through the channel waveguide array; output waveguides causes the separated six lights condensed to propagate, and a waveguide interval in first neighborhoods connected to the first slab is set to become wider than a first waveguide interval in a first connection section for connecting the channel waveguide array to the first slab, which achieves a reduced chip size, cost-reduction of chips, and reduces loss.

19 Claims, 16 Drawing Sheets

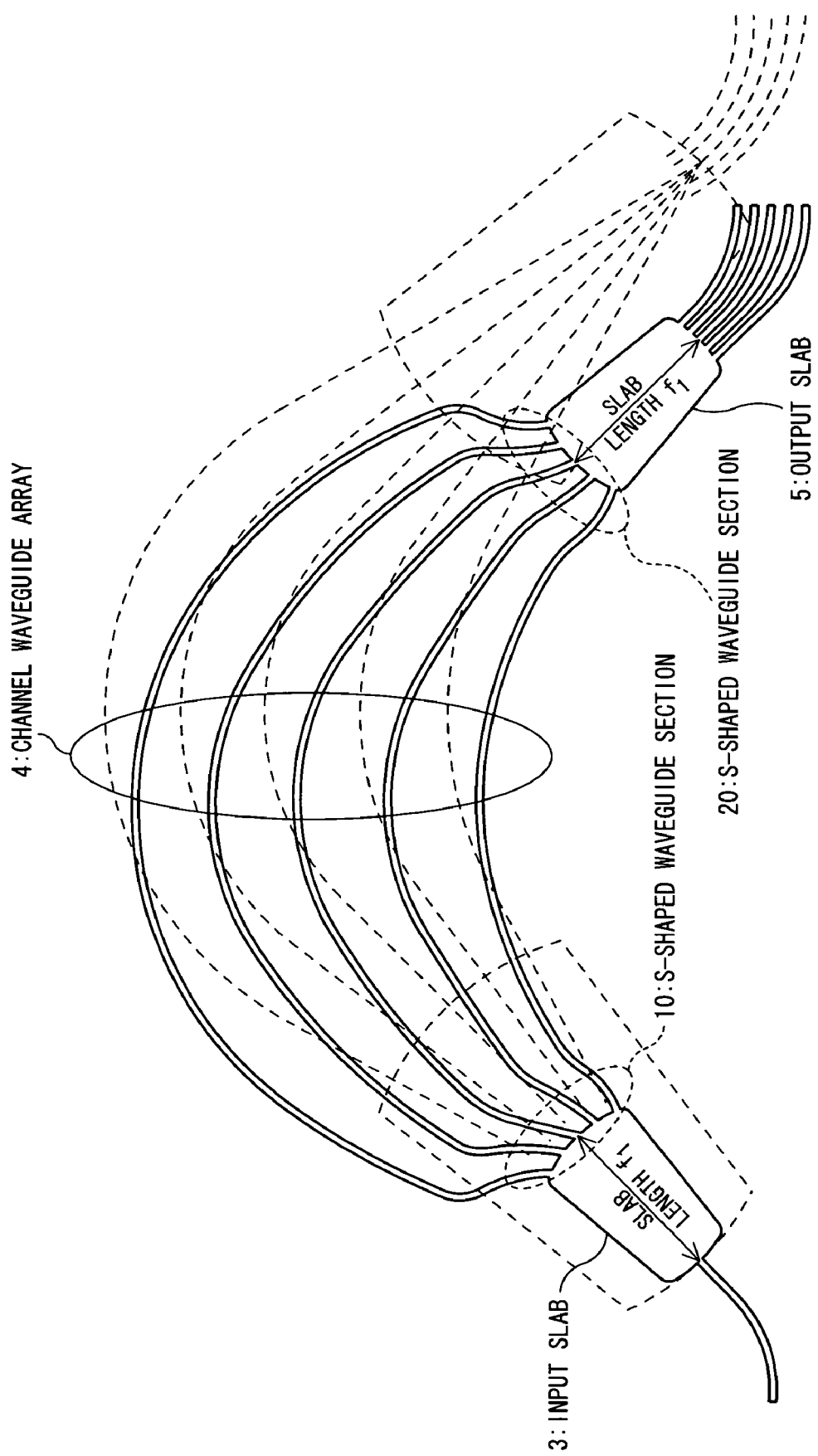

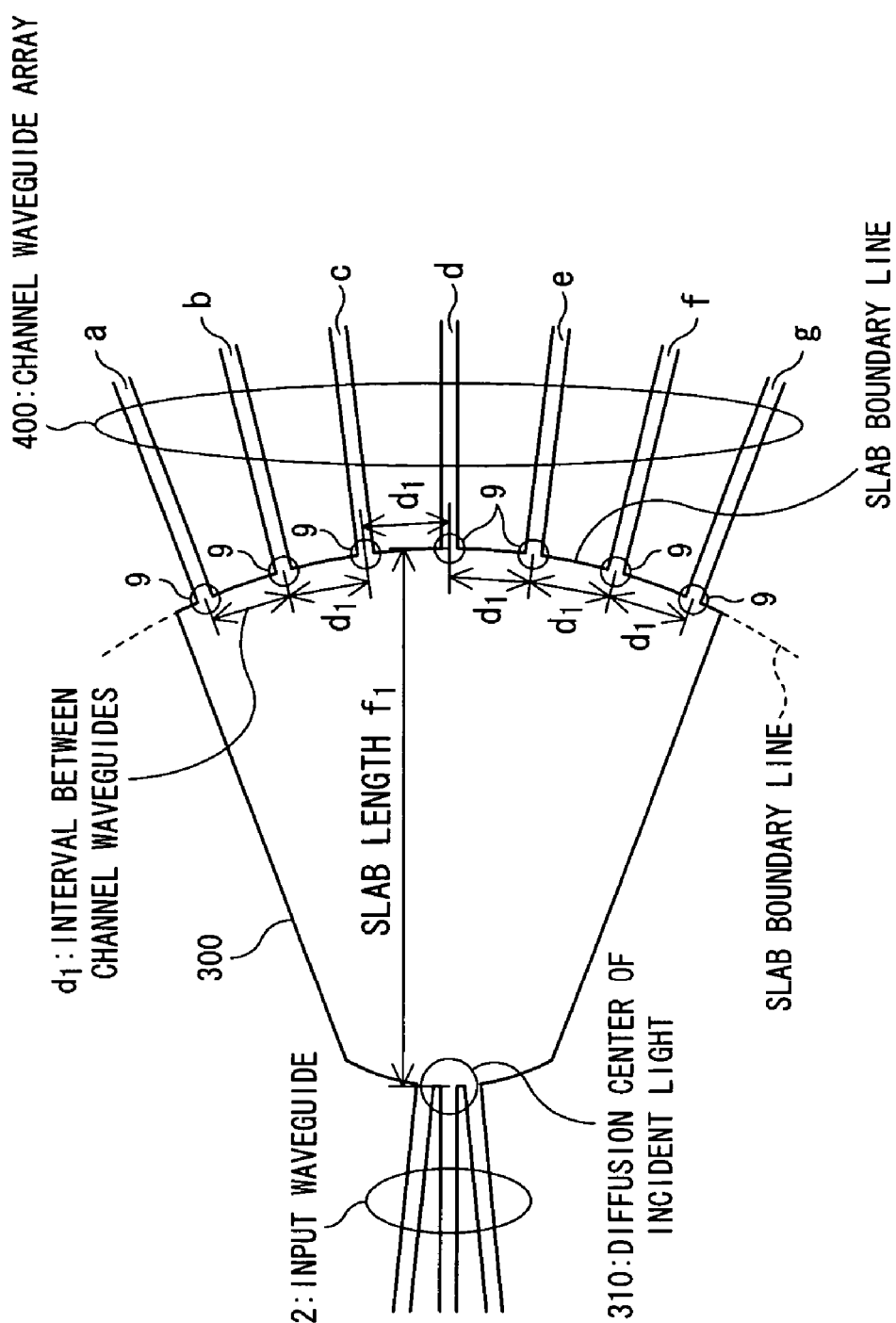

FIG. 15

| BASIC METHODS FOR PLOTTING CHANNEL WAVEGUIDE ARRAY | VARIABLE PARAMETERS FOR ADJUSTING LENGTH OF CHANNEL WAVEGUIDE | TYPICAL SOURCE DRAWINGS | PATENT PUBLICATIONS |
|---|---|---|---|
| | $L_i$: LENGTH OF LINEAR PORTION | | JP-HEI11-2733A |
| | $L_i$: LENGTH OF LINEAR PORTION<br>$R_i$: CURVATURE RADIUS OF CIRCULAR ARC<br>$\theta_i$: CENTER ANGLE OF CIRCULAR ARC | | JP-2000-352630A |
| | $L_{2i}$: LENGTH OF LINEAR PORTION<br>$L_{1i}$: LENGTH OF LINEAR PORTION<br>$R_i$: CURVATURE RADIUS OF CIRCULAR ARC<br>$\theta_i$: CENTER ANGLE OF CIRCULAR ARC | | JP-HEI10-90530A |

ARRAYED WAVEGUIDE WAVELENGTH MULTIPLEXING APPARATUS AND OPTICAL TRANSMITTER

This application is a continuation application, filed under 35 USC 111(a), of International Application PCT/JP2003/002124, filed Feb. 26, 2003.

FIELD OF THE INVENTION

The present invention relates to an arrayed waveguide wavelength multiplexing apparatus and an optical transmitter, which are suitable for use with a waveguide integrated optical component; e.g., wavelength division multiplexing or optical signal processing.

BACKGROUND (1) In wavelength division multiplexing (WDM) for simultaneously transmitting a plurality of optical signals of different wavelengths, a wavelength division multiplexing apparatus is an important device. A wavelength division multiplexing apparatus has the function of a wavelength multiplexing apparatus for multiplexing optical signals of different wavelengths (a multiplexing function) and the function of a wavelength divider for dividing wavelength-multiplexed light into optical signals of different wavelengths (a wavelength division function).

As a result, a plurality of information data sets are multiplexed by the wavelength division multiplexing apparatus and multiplexed into an optical wavelength band, and wavelength-multiplexed light assigned to channel 1 to channel "n" ("n" denotes a natural number, and a channel represents an optical wavelength). Light of desired channel "i" ("i" denotes a natural number) among the wavelength-multiplexed light is subjected to wavelength division by the wavelength division multiplexing apparatus provided at a relay station or a terminal station. The wavelength-divided optical signal of channel "i" is converted into an electric signal, and desired information data sets are delivered or transferred to a plurality of users.

In the field where the wavelength division multiplexing apparatus is utilized, the wavelength division multiplexing apparatus can be used as, for example, a branch section of an optical fiber for connecting access nodes of a main optical network to respective households, in addition to being used as an optical switch, an ADM (Add & Drop Multiplexing apparatus), or the like. Moreover, the wavelength division multiplexing apparatus is also used for processing an optical signal of a transmission terminal disposed in the household, or for like processing. An attempt can be made to curtail costs of these optical switches by miniaturizing hardware of the switches, and the quality of the optical switches is improved. In order to promote miniaturization of the hardware, the degree of integration of components of the hardware must be increased. In this regard, the wavelength division multiplexing apparatus is important also as an integrated optical component of waveguide type.

(1-1) About Arrayed Waveguide Grating (Hereinafter Referred to as an "AWG" Unless Otherwise Specified).

A plurality of types of wavelength division multiplexing apparatus have been known, and attention is given to AWG as a practical device (element) among these pieces of wavelength division multiplexing apparatus. This AWG uses an arrayed waveguide grating formed from an optical waveguide provided on a chip-like planer substrate.

FIG. 13 is a block diagram of the AWG. The AWG shown in FIG. 13 is formed from a substrate (e.g., a silicon substrate) 1 and an optical waveguide collectively fabricated on the substrate 1 through use of photolithography. The AWG is formed from an input waveguide 2; an input slab (an input-side slab waveguide) 300; an arrayed waveguide (a channel waveguide array) 400 made from seven (seven channels) channel waveguide (channel light waveguide) groups "a" to "g"; an output slab (an output-side slab waveguide) 500; and an output waveguide 6 made from seven waveguides "h" to "n." The seven channel waveguides "a" to "g" have the function of causing a phase difference and are called a phased array. The number of channel waveguides "a" to "g" is seven. However, this number can be set to a desired value.

As a result, the wavelength-multiplexed light input to the input waveguide 2 from the outside by way of, e.g., an optical fiber, is spread (diffused) by means of diffraction of the input slab 300. The thus-spread lights are input to (enter) the respective seven channel waveguides "a" to "g" constituting the arrayed waveguide 400 by way of seven slab connection sections (connection sections, connection portions) 9.

FIG. 14 is an enlarged view of the input slab 300 and the channel waveguide array 400. The slab connection sections 9 correspond to bases (roots) of the respective channel waveguides "a" to "g" shown in FIG. 14 and are seven locations on a slab boundary. An interval $d_1$ between the channel waveguides corresponds to a distance between two adjacent slab connection sections 9. Moreover, the channel waveguide interval $d_1$ usually becomes shorter with decreasing distance from a center 310 (the spreading center of incident light) achieved when incident light undergoes diffraction to an incident position of the channel waveguide array 400 (this distance will be hereinafter referred to as a "slab length").

The lengths of the seven channel waveguides "a" to "g" shown in FIG. 13 (waveguide lengths) differ from each other. Wavelength-multiplexed lights #1 to #7 entering the arrayed waveguide 400 are in phase with each other. However, the wavelength-multiplexed lights #1 to #7 are out of phase with each other at the output side of the arrayed waveguide 400 in accordance with a difference between the lengths of the seven channel waveguides "a" to "g."

The wavelength-multiplexed lights #1 to #7 are output (radiated) from the respective channel waveguides "a" to "g" and interfere with each other. The thus-output wavelength-multiplexed lights are gathered in (converged on) the vicinity of the slab connection section 9 existing between the output slab 500 and the output waveguide 6. Positions where single lights of respective wavelengths included in the wavelength-multiplexed lights #1 to #7 (hereinafter called "single lights") are gathered change from one wavelength to another. For this reason, components of wavelength 1 included in the wavelength-multiplexed lights #1 to #7 from the channel waveguide "a" are gathered in a channel waveguide "h" among seven channel waveguides "h" to "n" constituting the output waveguide 6, by way of the output slab 5. Components of the respective wavelengths 2 to 7 are gathered in the channel waveguides "i" to "n." Accordingly, the wavelength-multiplexed lights #1 to #7 are divided into single lights #1 to #7, so that the wavelength division function is exhibited. The gathered seven single lights are input into the seven channel waveguides "h" to "n" of the output waveguide 6 and guided to the end of the substrate 1.

The seven single lights are input into the output waveguide 6 and transferred in the direction opposite that mentioned previously. As a result, the wavelength-multiplexed lights #1 to #7 are obtained from the input waveguide 300, thereby exhibiting the multiplexing function.

As mentioned above, the AWG realizes an operation analogous to that of a spectrometer using a long-known diffraction grating, through use of the channel waveguides "a" to "g" collectively fabricated on the substrate 1. Therefore, the AWG is considered to be a promising, compact wavelength division multiplexing apparatus for wavelength multiplexing communication which is conducive to mass production.

Generally, the multiplexing function can be realized by rendering the input and output directions of light opposite to the input and output directions of light achieved at the time of wavelength division. Unless otherwise specified, the following descriptions are provided while attention is paid chiefly to the wavelength division function among the two functions.

(1-2) About a Method for Plotting the Geometry of the Channel Waveguide Array 400 of Seven Channel Waveguides The geometry of the channel waveguide array 400 is plotted such that a difference between the lengths of adjacent channel waveguides, such as the channel waveguides "c" and "d," among the seven channel waveguides "a" to "g" becomes constant.

FIG. 15 is a view for describing basic methods for plotting a conventional channel waveguide array, wherein the view consists of an upper row, a middle row, and a lower row. An arrayed grating optical division multiplexing apparatus provided in the upper row of FIG. 15 is formed such that an interval between waveguides of a channel waveguide array at a boundary between a first fan-shaped slab waveguide and the channel waveguide array becomes different from an interval between waveguides of a channel waveguide array at a boundary between the channel waveguide array and a second fan-shaped slab waveguide (e.g., Patent Document 1).

According to the plotting method provided in the upper row, the lengths of the respective channel waveguides are adjusted by adjusting the lengths $L_i$ of linear portions (linear sections) of the vertical channel waveguide. As a result, the degree of freedom of design can be increased, and a device capable of effecting highly-functional optical frequency separation and optical frequency wavelength multiplexing can be obtained.

In an optical wavelength division multiplexing apparatus provided in the middle row of FIG. 15, the lengths of respective arrayed waveguides of an arrayed waveguide diffraction grating are adjusted such that an error between phases of light waves developing in the arrayed waveguide diffraction grating is substantially eliminated (e.g., Patent Document 2).

According to the plotting method provided in the middle row of FIG. 15, the lengths of the respective channel waveguides are adjusted by adjusting the length $L_i$ of a linear portion of the channel waveguide connected to the slab, the curvature radius $R_i$ of a circular arc, and a central angle $\theta_i$ of the circular arc. Thereby, an error between the amounts of changes in phases of the light waves traveling through the arrayed waveguide becomes small, and crosstalk deterioration due to a side lobe, or the like, is dampened.

An arrayed waveguide grating provided in the lower row of FIG. 15 is for connecting two output waveguides, one being longer than the other, to a first fan-shaped slab waveguide with an interval which is half that existing between output channel waveguides, wherein the two output waveguides belong to input channel waveguides including two waveguides having a predetermined optical path length difference and two 3 dB couplers constituting an asymmetrical Mach-Zehnder interferometer coupling both ends of the two waveguides (e.g., Patent Document 3).

According to the plotting method provided in the lower row of FIG. 15, the lengths of the respective channel waveguides are adjusted by adjusting the length $L_i$ of a linear portion of the channel waveguide connected to the slab, the curvature radius $R_i$ of a circular arc, a central angle $\theta_i$ of the circular arc, and a length $L_{2i}$ of a linear portion of a channel waveguide connected to the circular arc.

As a result, a flat band which is half an interval between channels or more is obtained, and there is realized a flat optical frequency characteristic whose wavelength division output characteristic remains essentially constant even when the wavelengths of the light source have changed.

As mentioned above, a variety of geometries or structures for the AWG have hitherto been proposed, and the above-described three types of geometries have been known as the basic methods for plotting a channel waveguide.

A wavelength division multiplexing apparatus capable of handling add-and-drop function is also known (e.g., Patent Document 4). This wavelength division multiplexing apparatus is constituted such that a waveguide grating router and a phase-shifter cause reflection. By virtue of this configuration, the result of a test on transmission of light over 16 channels at 100 GHz using InP (indium phosphorus) is improved.

Moreover, an AWG which realizes high wavelength isolation at low cost is also known (e.g., Patent Document 5).

(1-3) About Miniaturization of the AWG

In accordance with expansion of utilization of wavelength division multiplexing, a compact AWG suitable for mass production is desirable. Therefore, demand has hitherto existed for lowering the costs of chips by increasing the number of chips per wafer (also called a "yield" and corresponds to a proportion of non-defective chips to manufactured chips) by means of reducing a chip size (the size of the substrate 1 having waveguides fabricated thereon, the size of a substrate on which waveguides have not yet been fabricated, or the area of the substrate). Another desire also exists for diminishing a loss in a waveguide and lessening a loss in the slab connection section 9 by means of miniaturizing the chip size.

FIG. 16 is a view for describing a relationship between the channel waveguide interval $d_1$ and the slab length $f_1$ in the slab connection section 9. A ratio of the channel waveguide interval $d_1$ to the slab length $f_1$ in the slab $T_1$ shown in FIG. 16; that is, $d_1/f_1$, and a ratio of a channel waveguide interval $d_{11}$ to a slab length f' in a slab $T_2$ shown in FIG. 16; that is, $d_{11}/f'$, are constant ('/' denotes a division operation). Accordingly, in order to reduce the slab length $f_1$ of the slab $T_1$, the channel waveguide interval $d_1$ in the slab connection section 9 must be reduced.

(1-4) However, signal lights (separated light) propagating through the respective channel waveguides "a" to "g" of the AWG all shift to any of the adjacent channel waveguides "a" to "g" while propagating through the channel waveguides "a" to "g," whereby distortion of phase information (phase difference) and deteriorating characteristics of respective signal lights are induced, to thus cause so-called crosstalk.

Therefore, broadening the channel waveguide interval $d_1$ so as to reduce optical coupling between the channel waveguides "a" to "g" is indispensable. Particularly, a phase difference between any of the adjacent channel waveguides in an area (a region) other than the neighborhood of the slab connection section 9 is larger than that achieved in the vicinity of the slab connection section 9. Hence, the influence of optical coupling existing between the channel waveguides "a" to "g" is noticeable. Accordingly, there is adopted a waveguide structure where the channel waveguide intervals "a" to "g" become larger with increasing distance from the slab connection section 9.

In general, the channel waveguide interval $d_1$ in the slab connection section 9 used in the AWG and the channel waveguide interval $d_{11}$ in the area most distant from the slab connection section 9 change according to a difference $\Delta n$ between a specific refraction factor of the core of the channel waveguide and a specific refraction factor of the clad of the same. For instance, in the case of a channel waveguide of $\Delta n=0.75\%$, factors of $d_1=14\,\mu m$ to $20\,\mu m$ and $d_{11}=30$ to $40\,\mu m$ are used.

The core is an area where the AWG is fabricated and which is made from material whose refractive index is higher than that of an area surrounding the AWG. The clad is an area which surrounds the core and is made from material whose refractive index is lower than that of the core.

As mentioned above, when the adjacent channel waveguides are arranged over a long distance while being separated from each other by only a small interval $d_1$, the adjacent channel waveguides cause cross-talk or a transmission loss, thereby deteriorating characteristics of an optical signal.

Accordingly, in consideration of deterioration of characteristics stemming from coupling between the channel waveguides, the channel waveguide interval $d_1$ or $d_{11}$ in the slab connection section 9 of the conventional AWG cannot be reduced. Therefore, there exists a problem of an increase in the slab length $f_1$ or $f'$ and an increase in the chip size of the AWG. Put another way, when the channel waveguide interval $d_1$ or $d_{11}$ in the slab connection section 9 is reduced for diminishing the chip size of the AWG, deterioration, such as cross-talk or a transmission loss, arises.

The AWGs described in Patent Documents 1 to 5 are all not intended for reducing a chip size.
Patent Document 1
Japanese Patent Laid-Open No. HEI 11-2733
Patent Document 2
Japanese Patent Laid-Open No. 2000-352630
Patent Document 3
Japanese Patent Laid-Open No. HEI10-90530
Patent Document 4
U.S. Pat. No. 6,141,467
Patent Document 5
Japanese Patent Laid-Open No. 2001-174653

DISCLOSURE OF THE INVENTION

The present invention has been conceived in view of the above-described problems and aims at providing an arrayed waveguide wavelength division multiplexing apparatus and an optical transmitter, which have a highly desirable waveguide characteristic, such as a reduction in chip size and a reduction in costs of a chip, in connection with a wavelength division multiplexing apparatus used in, e.g., wavelength division multiplexing or optical signal processing.

To this end, an arrayed waveguide wavelength multiplexing/demultiplexing apparatus of the present invention has, on a substrate, one or a plurality of input waveguides for propagating and outputting wavelength-multiplexed light into which a plurality of lights of wavelengths are multiplexed; a first slab for diffusing the wavelength-multiplexed light outputted from the input waveguide; a channel waveguide array which has a plurality of channel waveguides of different lengths, which separates wavelength-multiplexed light diffused by the first slab according to the plurality of wavelengths, and which causes the separated lights to propagate; a second slab for condensing the plurality of separated lights having propagated through the channel waveguide array; and one or a plurality of output waveguides for causing the lights condensed by the second slab to propagate, wherein a waveguide interval in at least either first neighborhoods of the respective channel waveguides to be connected to the first slab or second neighborhoods of the respective channel waveguides to be connected to the second slab is set so as to become wider than a waveguide interval in a first connection section for connecting the channel waveguide array to the first slab or a waveguide interval in a second connection section for connecting the channel waveguide array to the second slab.

Consequently, by virtue of this, the chip size of the arrayed waveguide wavelength division multiplexing apparatus can be reduced. As a result, the chip size is reduced, and the number of chips per unit wafer is increased, thereby curtailing costs of the chip.

Moreover, the first or second neighborhood of at least one of the plurality of channel waveguides may be formed so as to bend in a direction from a center channel waveguide of the plurality of channel waveguides to an outer channel waveguide. Alternatively, the first or second neighborhood of at least one of the plurality of channel waveguides may be formed from a plurality of waveguide shaving geometries of different degrees of flex for the respective channel waveguides. By virtue of this, miniaturization of the chip size is promoted, and efficiency of mass production is significantly enhanced.

Curvature radii of respective S-shaped waveguides serving as the plurality of channel waveguides may be made smaller from a center channel waveguide of the plurality of channel waveguides toward an outer channel waveguide. Alternatively, curvature radii of respective S-shaped waveguides serving as the plurality of channel waveguides may be made smaller from a shortest channel waveguide toward a longest channel waveguide of the plurality of channel waveguides or from the longest channel waveguide toward the shortest channel waveguide. By means of this, a loss in the waveguide is diminished by reducing a chip size, and a loss in the slab connection section can be reduced. As a result, utilization of wavelength division multiplexing is expanded. Moreover, widths of respective S-shaped waveguides serving as the plurality of channel waveguides may be narrow at a slab connection section corresponding to bases of the plurality of channel waveguides and may become wider at circular-arc portions of the S-shaped waveguides facing the first or second slab toward a propagating direction of the wavelength-multiplexed light. Alternatively, widths of respective S-shaped waveguides serving as the plurality of channel waveguides achieved in a slab connection section corresponding to bases of the plurality of channel waveguides may become equal to widths of the S-shaped waveguides other than the slab connection section. By means of these configurations, the channel waveguides in the slab connection section can be manufactured without formation of a tapered shape.

The first or second neighborhood of at least one of the plurality of channel waveguides may be provided with at least one selected from the group consisting of an S-shaped waveguide having a predetermined radius of curvature, a linear portion, and a circular-arc portion having a predetermined radius of curvature and a circular-arc angle. By means of this configuration, the optical path lengths of the respective channel waveguides can be adjusted by means of the length of the linear portion and a curvature radius of the circular-arc waveguide. A desired phase distribution can be obtained by correcting a phase difference having arisen in the S-shaped channel waveguide. A geometrical pattern can be designed, manufactured, or finely adjusted with high accuracy.

An arrayed waveguide wavelength division multiplexing apparatus of the present invention is characterized by a formation such that waveguide interval in at least either third neighborhoods of the respective input waveguides to be connected to the first slab or fourth neighborhoods of the respective output waveguides to be connected to the second slab is set so as to become wider than a waveguide interval in a third connection section for connecting the input waveguide array to the first slab or a waveguide interval in a fourth connection section for connecting the output waveguide array to the second slab.

Accordingly, by means of this configuration, there can be obtained a compact arrayed wavelength division multiplexing apparatus without involvement of deterioration of characteristics, which would otherwise be induced by coupling between the channel waveguides in an area other than the slab connection section.

The third neighborhoods of the input waveguides or the fourth neighborhoods of the output waveguides may be formed so as to bend in a direction from a center waveguide toward an outer waveguide. Alternatively, the third neighborhoods of the input waveguides or the fourth neighborhoods of the output waveguides may be provided with a plurality of waveguides having geometries of different degrees of flex for the respective input or output waveguides.

Further, curvature radii of respective S-shaped waveguides serving as the plurality of channel waveguides may be made smaller from a center waveguide of the input or output waveguides toward an outer waveguide. Alternatively, curvature radii of respective S-shaped waveguides serving as the plurality of channel waveguides may be made smaller from a shortest channel waveguide toward a longest channel waveguide of the input or output waveguides. By means of these configurations, a loss in a waveguide and a loss in the slab connection section can be diminished by reducing a chip size. Thereby, utilization of wavelength division multiplexing is expanded.

An arrayed wavelength division multiplexing apparatus of the present invention is characterized in that the plurality of channel waveguides are separated at intervals required to prevent occurrence of interference of light among the respective channel waveguides, in at least first neighborhoods of the respective channel waveguides to be connected to the first slab, second neighborhoods of the respective channel waveguides to be connected to the second slab, third neighborhoods of the respective input waveguides to be connected to the first slab, or fourth neighborhoods of the respective output waveguides to be connected to the second slab.

Accordingly, an optical transmission apparatus of the present invention has an optical signal output section for outputting a plurality of optical signals of different wavelengths and an arrayed wavelength division multiplexing apparatus which merges the plurality of optical signals outputted from the optical signal output section to thus output wavelength-multiplexed light, the arrayed wavelength division multiplexing apparatus comprising, on a substrate; one or a plurality of input waveguides for propagating and outputting wavelength-multiplexed light into which a plurality of lights of wavelengths are multiplexed; a first slab for diffusing the wavelength-multiplexed light outputted from the input waveguide; a channel waveguide array which has a plurality of channel waveguides of different lengths, which separates wavelength-multiplexed light diffused by the first slab according to the plurality of wavelengths, and which causes the separated lights to propagate; a second slab for condensing the plurality of separated lights having propagated through the channel waveguide array; and one or a plurality of output waveguides for causing the lights condensed by the second slab to propagate, wherein a waveguide interval in at least either first neighborhoods of the respective channel waveguides to be connected to the first slab or second neighborhoods of the respective channel waveguides to be connected to the second slab is set so as to become wider than a waveguide interval in a first connection section for connecting the channel waveguide array to the first slab or a waveguide interval in a second connection section for connecting the channel waveguide array to the second slab.

Accordingly, by means of this configuration, the packing density of individual hardware components is increased by miniaturization, thereby promoting cost reduction and expanding utilization of wavelength division multiplexing.

BRIEF DESCRIPTION OF THE DRAWINGS

FIG. 8 is a view for describing miniaturization of an AWG according to the first embodiment of the present invention;

FIG. 14 is an enlarged view of an input slab and a channel waveguide array;

FIG. 15 is a view for describing basic methods for plotting a conventional channel waveguide array.

BEST MODES FOR CARRYING OUT THE PRESENT INVENTION (A) Description of a First Embodiment of the Present Invention FIG. 1 is a block diagram of an AWG according to a first embodiment of the present invention. An AWG 1 shown in FIG. 1 can realize a multiplexing function as a wavelength multiplexer for multiplexing optical signals of different wavelengths and a wavelength division function as a wavelength divider for dividing multiplexed light into optical signals of different wavelengths. The AWG comprises a substrate 1 (AWG 1), and optical waveguides collectively fabricated on the substrate 1 through use of photolithography. The AWG has an input waveguide 2, an input slab (an input-side slab waveguide) 3, an arrayed waveguide (a channel waveguide array) 4 formed from six channel waveguide groups "a" to "f," an output slab (an output-side slab waveguide) 5, and an output waveguide 6 formed from six waveguides "h" to "l" (el).

Here, wavelength-multiplexed lights #1 to #6 are transmitted in a direction from the input waveguide 2 toward the output waveguide 6. The wavelength-multiplexed lights are subjected to wavelength division by the AWG 1, and single lights #1 to #6 of respective wavelengths are outputted from the output waveguide 6. The multiplexing function of the AWG 1 is realized by inputting the single lights of different wavelengths from the output waveguide 6 and causing the thus-input single lights to travel through the output slab 5 in a direction opposite that achieved in the case of wavelength division. Descriptions are provided below while attention is paid primarily to the wavelength division function.

Figure 1:
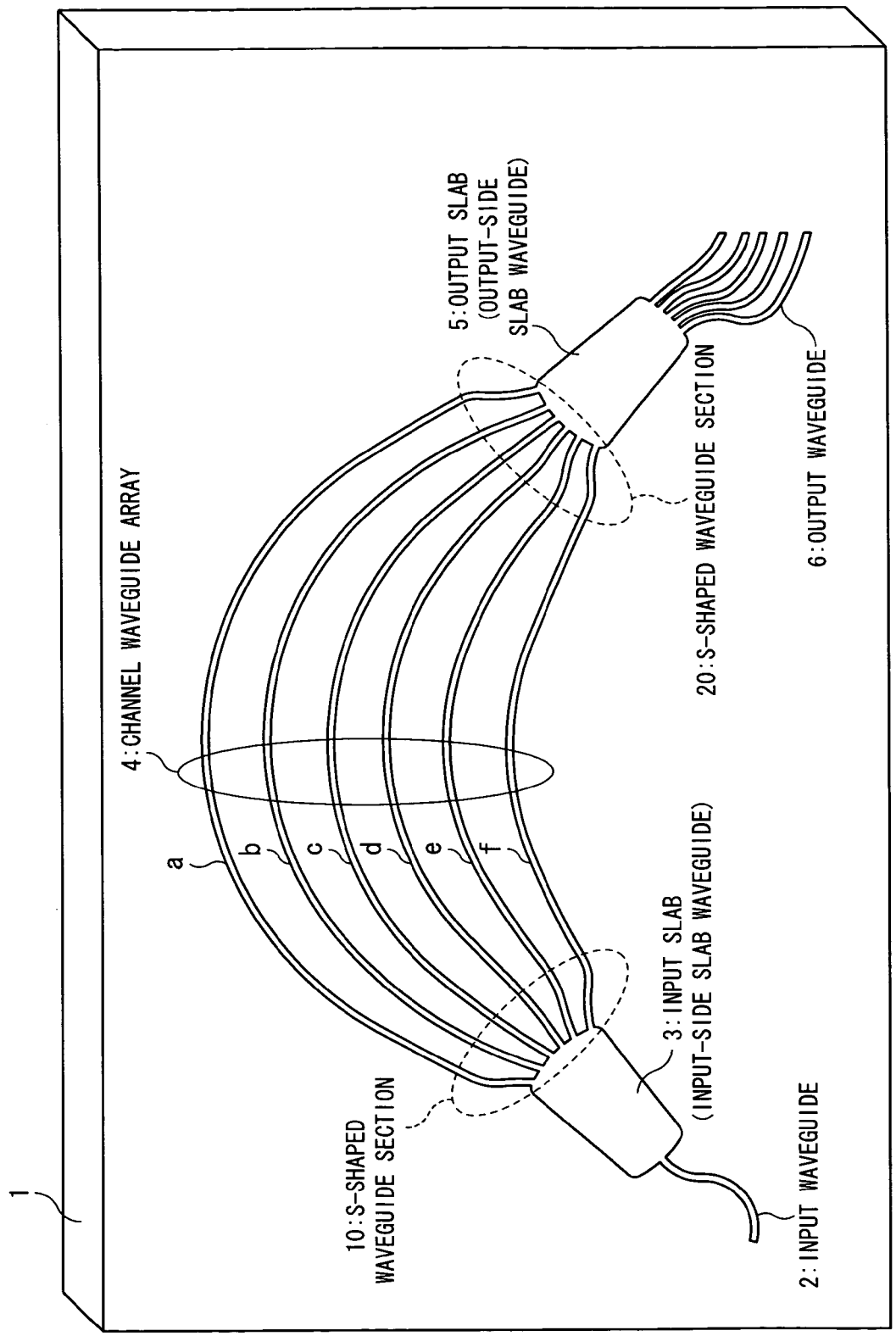
FIG. 1 is a block diagram showing an AWG according to a first embodiment of the present invention.

Material of the substrate 1 shown in FIG. 1 is, e.g., silicon, and a piece sliced off from a wafer is used for the substrate 1.

The input waveguide 2 is provided on the substrate 1 for enabling propagation and output of the wavelength-multiplexed lights #1 to #6 into which six types of lights are multiplexed. The input slab 3 is for spreading (or distributing) the wavelength-multiplexed lights #1 to #6 outputted from the input waveguide 2.

Moreover, the channel waveguide array 4 has six channel waveguides "a" to "f" of different lengths; separates the wavelength-multiplexed lights #1 to #6 spread by the input slab 3 into six types of wavelengths; and cases six separated lights to propagate. Intervals $d_1$ among the six adjacent channel waveguides "a" to "f" are identical (see FIG. 2). The channel waveguides are formed such that a given difference exists between adjacent channel waveguides. Thereby, a phase difference arises in the respective wavelength-multi-plexed lights #1 to #6 at the output terminal sections of the six channel waveguides "a" to "f."

Further, the output slab 5 gathers the six separated lights that have traveled through the channel waveguide array 4. The output waveguide 6 is for transferring the light gathered by the output slab 5 and is formed from six waveguides "h" to "l."

Various materials, such as glass ($SiO_2$), semiconductor (GaAs-based semiconductor, InP-based semiconductor, GaN-based semiconductor, or the like), lithium niobate ($LiNbO_3$), or the like can be used as materials for the input waveguide 2, the output waveguide 6, and the channel waveguide array 4.

The input waveguide 2 may be provided with a plurality of waveguides; e.g., six waveguides, whereby the AWG 1 can exhibit the multiplexing function. Specifically, the wavelength-multiplexed lights #1 to #6 are input to the output waveguide 6, and the wavelength-multiplexed lights #1 to #6 are caused to travel in a direction opposite the propagating direction, and six types of single lights can also be outputted from the input waveguide 2.

Moreover, the output waveguide 6 can also be formed from solely one waveguide. In this case, the wavelength-multiplexed lights #1 to #6 are input to one output waveguide 6 and caused to travel in the direction opposite that mentioned previously, whereupon six types of single lights are outputted from the input waveguide 2. Thereby, the AWG 1 can subject to multiplexing the wavelength-multiplexed lights #1 to #6 input in the opposite direction.

Accordingly, the AWG 1 of the present invention can realize the multiplexing function and the wavelength division function. By means of these functions, the AWG can be produced for general purposes according to a function or application. This also contributes to cost reduction of the AWG 1.

The channel waveguide array 4 will be described in more detail.

S-shaped waveguide sections 10, 20 are formed at respective ends of the channel waveguide array 4. The S-shaped waveguide section 10 or 20 is formed from, e.g., six S-shaped waveguides "a" to "f" or "h" to "l." Here, the S-shaped waveguide section 10 is a neighborhood (a first neighborhood) to be connected to the input slab 3 of the respective channel waveguides "a" to "f". Further, the S-shaped waveguide section 20 is a neighborhood (a second neighborhood) to be connected to the output slab 5 of the respective channel waveguides "a" to "f." The interval between the waveguides in the S-shaped waveguide section 10 is determined so as to become wider than a waveguide interval in a connection section (first connection section) between the channel waveguide array 4 and the input slab 3, which will be described below. Similarly, the interval between the waveguides in the S-shaped waveguide section 20 is determined so as to become wider than a waveguide interval in a connection section (second connection section) between the channel waveguide array 4 and the output slab 5, which will be described below. Put another way, the six channel waveguides "a" to "f" are spaced from each other by an interval required to prevent occurrence of optical interference between the channel waveguides "a" to "f" in a some or all of the first neighborhoods of the respective channel waveguides "a" to "f" connected to the input slab 3 and the second neighborhoods of the respective channel waveguides "a" to "f" connected to the output slab 5.

The AWG 1 of the present invention is formed such that the neighborhoods of the six channel waveguides "a" to "f" are bent from the center channel waveguide "c" (or "d") of the six channel waveguides "a" to "f" toward the outer channel waveguide "a" (or "f"). Specifically, the neighborhoods of the six channel waveguides "a" to "f" are formed from a plurality of waveguides "a" to "f" whose shapes differ from each other in terms of degree of bending. Here, the expression "degree of bending" means the manner of bending and signifies that the way the channel waveguides "a" to "f" are bent changes from one to another.

Figure 5B:
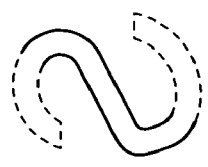
FIG. 5(b) is a view showing the geometry of channel waveguides having a shape essentially identical with that of an inverted S-shaped curved portion.
Figure 5A:
FIG. 5(a) is a view showing the geometry of channel waveguides having essentially the same shape as that of an S-shaped curved portion.
Figure 5E:
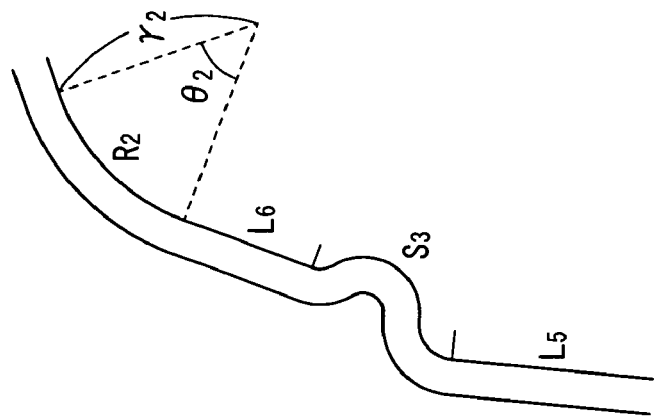
FIGS. 5(d) and 5(e) are views showing geometrical patterns of a neighborhood of the channel waveguide according to the first embodiment of the present invention.
Figure 5D:
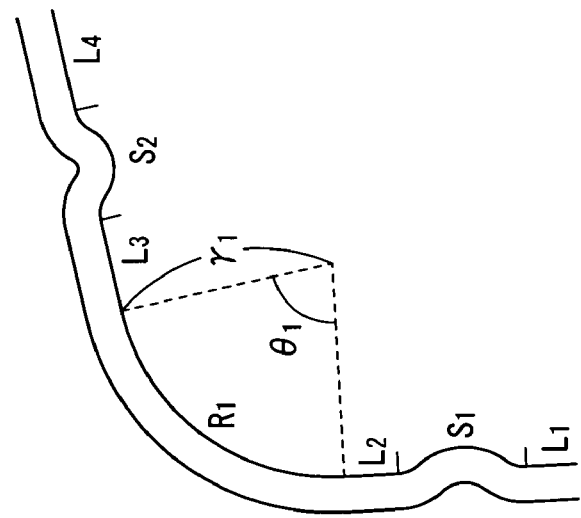
Figure 5C:
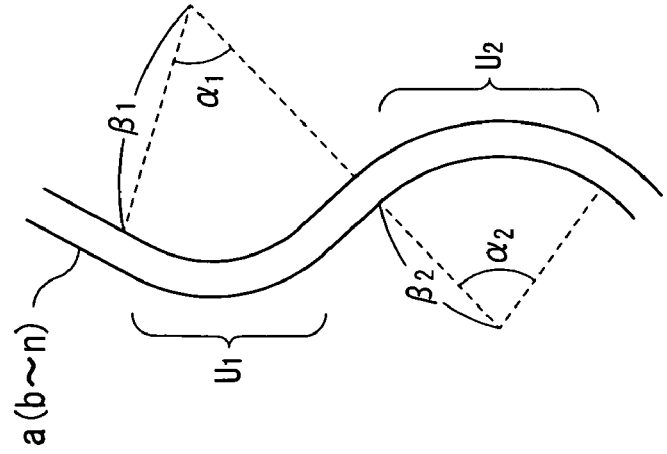
FIG. 5(c) is a view showing the geometry of channel waveguides having the shape of a letter S extended slightly in a vertical direction.

Example shapes which differ from each other in terms of degree of bending are provided in FIGS. 5(a) to 5(c).

FIG. 5(a) is a view showing the geometries of the channel waveguides "a" to "f" (indicated by solid lines) having essentially the same shape as that of an S-shaped curved portion (indicated by dotted lines). FIG. 5(b) is a view showing the geometry of the channel waveguides "a" to "f" (indicated by solid lines) having a shape essentially identical with that of an inverted S-shaped curved portion (indicated by dotted lines).

FIG. 5(c) is a view showing the geometry of the channel waveguides "a" to "f" having the shape of a letter S slightly extended in a vertical direction The shape of the channel waveguide "a" shown in FIG. 5(c) is analogous to a portion of a meandering shape or a portion of a waveform of a cosine function. A method for plotting the geometries of the S-shaped waveguides "a" to "f" will be described later.

In the following descriptions, the shapes shown in FIGS. 5(a) to 5(c), shapes formed by slightly extending these shapes in vertical and horizontal directions, and shapes formed by slightly contracting the shapes in the vertical and horizontal directions are described as having "S-shaped geometries."

The geometries of the S-shaped waveguides "a" to "f" will be described in more detail by reference to FIGS. 2 to 4 and FIG. 5(c).

Figure 2:
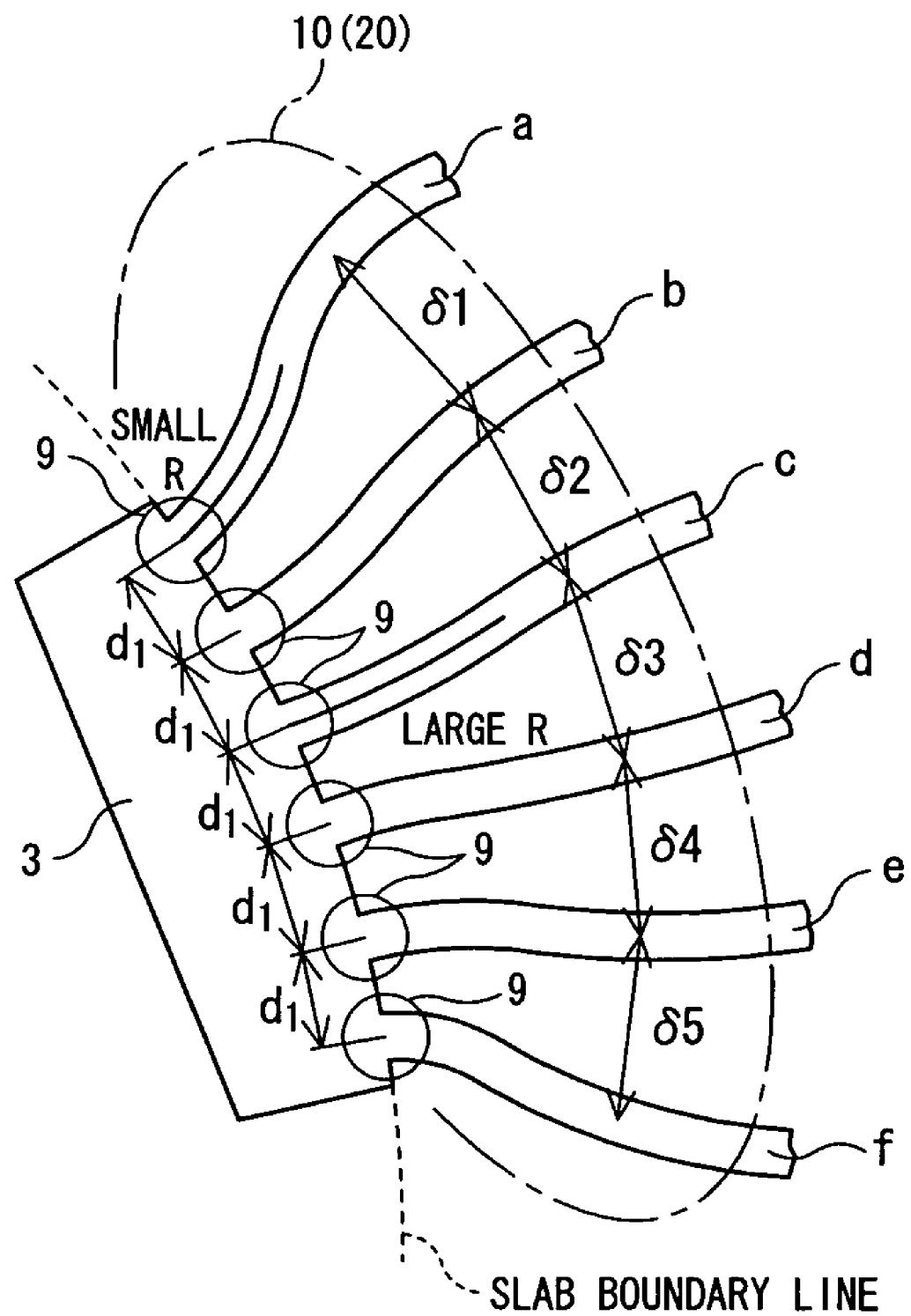
FIG. 2 is a view for describing the geometry of a first S-shaped waveguide according to a first embodiment of the present invention.
Figure 3:
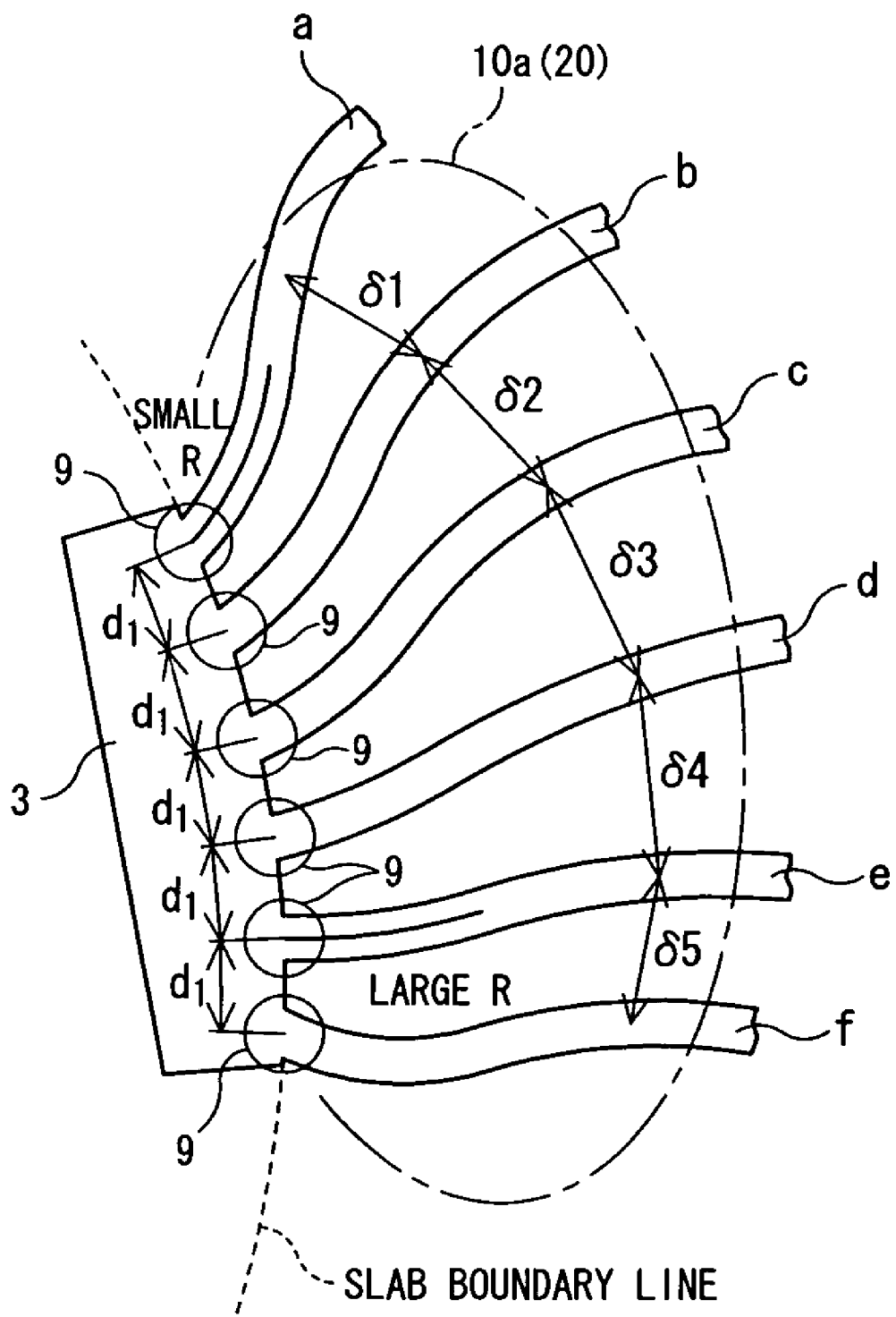
FIG. 3 is a view for describing the geometry of a second S-shaped waveguide according to a first embodiment of the present invention.
Figure 4:
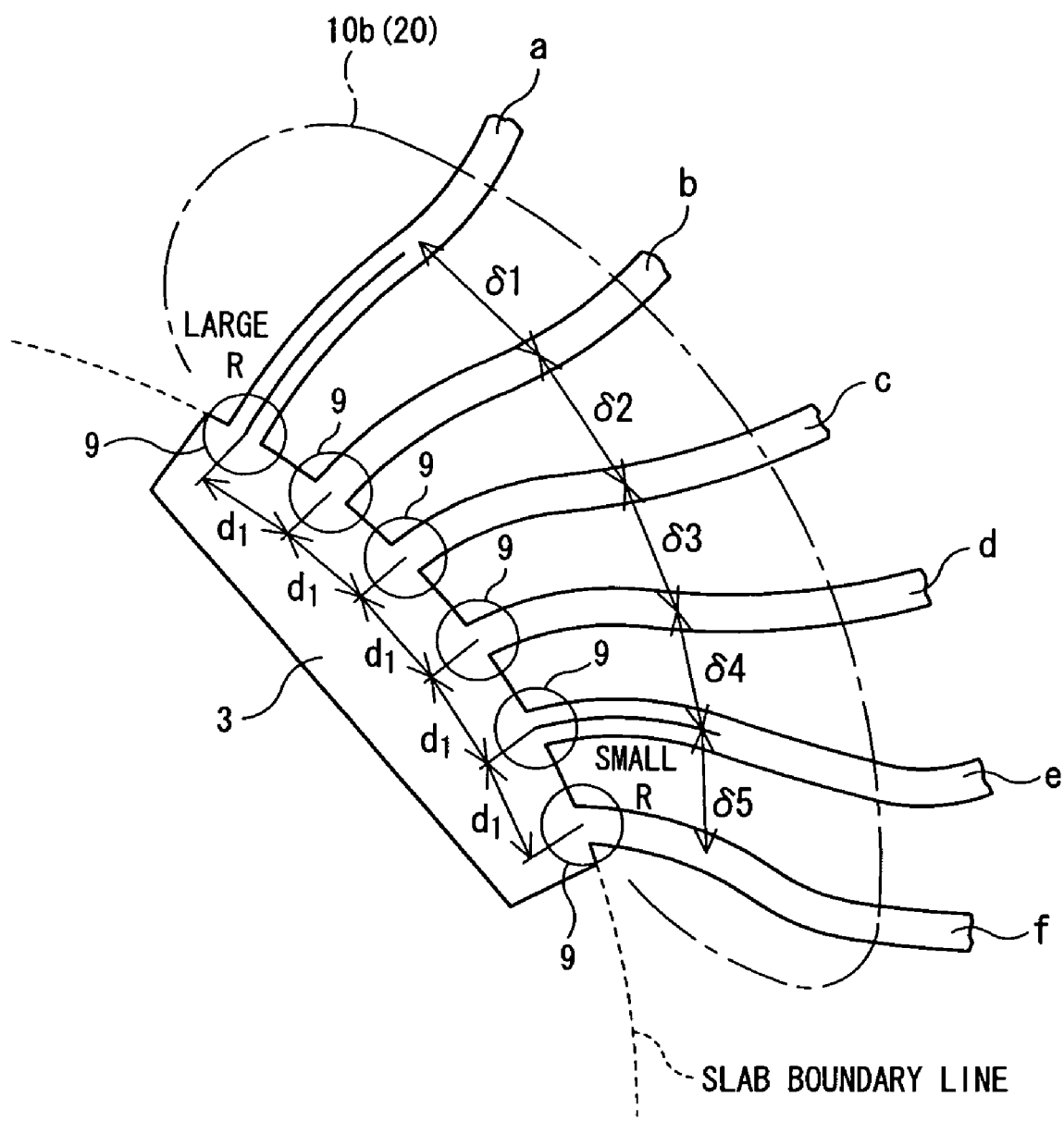
FIG. 4 is a view for describing the geometry of a third S-shaped waveguide according to a first embodiment of the present invention.

FIGS. 2 to 4 are views for describing the geometries of the S-shaped waveguide sections 10 and 20 according to the first embodiment of the present invention, showing in an enlarged manner the neighborhoods of the channel waveguides "a" to "f" connected to the input slab 3 shown in FIG. 1. Slab connection sections 9 shown in FIGS. 2 to 4 correspond to bases of the respective channel waveguides "a" to "f"; that is, six areas located on a slab boundary line (see the area indicated by dotted lines). Moreover, a distance between adjacent slab connection sections 9 is represented by $d_1$ (a channel waveguide interval $d_1$).

The S-shaped waveguide section 10 shown in FIG. 2 is formed such that the curvature radii R of the respective S-shaped waveguides "a" to "f" of the six channel waveguides "a" to "f" become gradually smaller from the center channel waveguide "c" (or "d") of the six channel waveguides "a" to "f" toward the outer channel waveguide "a" (or "f"). For instance, the curvature radius R of the channel waveguide "a" is smaller than the curvature radius R of the channel waveguide "c."

Channel waveguide intervals δ1 to δ6 in the areas of the six channel waveguides "a" to "f" other than the slab connection sections 9 are wider than the channel waveguide interval $d_1$ between the slab connection sections 9.

A method for plotting the geometries of the S-shaped waveguides "a" to "f" using parameters will now be described by reference to FIG. 5(c). The channel waveguide "a" shown in FIG. 5(c) is formed from a first curved section (a circular-arc section) $U_1$ determined by a curvature radius $\beta_1$ and a circular-arc angle $\alpha_1$, and a second curved section $U_2$ determined by a curvature radius $\beta_2$ and a circular-arc angle $\alpha_2$, the curved sections being formed continuously. Here, the curvature radius $\beta_1$ is expressed by the radius of a complete circle (not shown) having the circular-arc section $U_1$ as a circumference, and the curvature radius $\beta_2$ is expressed by the radius of a complete circle (not shown) having the circular-arc section $U_2$ as a circumference. A method for determining the curvature radii $\beta_1$, $\beta_2$ is an example, and various parameters can be used as plotting parameters ($\alpha_1$, $\beta_1$, $U_1$, and $\alpha_2$, $\beta_2$, $U_2$).

Here, the expression "curvature radius is small" means that the degree of bending is large and that the curvature radius $\beta_1$ and the circular-arc angle $\alpha_1$ are small. The expression "curvature radius is large" means that the degree of bending is small and that the curvature radius $\beta_1$ and the circular-arc angle $\alpha_1$ are large. Unless otherwise specified, these expressions are used to express the same meaning in the following descriptions.

The channel waveguides "b" to "f" are also the same as the channel waveguide "a," and hence repeated explanations thereof will be omitted.

As mentioned above, in relation to the AWG 1 of the present invention, the S-shaped waveguide section 10 formed in the vicinity of the channel waveguide "a" shown in FIG. 2 to be connected to the input slab 3 makes narrow the channel waveguide interval $d_1$ between the channel waveguides "a" and "b." Meanwhile, the circular-arc portion formed on the output slab 5 side of the S-shaped waveguide section 10 gradually makes wider the interval $d_1$ between the channel waveguide "a" and the channel waveguide "b" toward the S-shaped waveguide section 10.

The S-shaped waveguide section 20 can also be configured in the same manner as is the S-shaped waveguide section 10.

Here, the interval between conventional channel waveguides is compared with the interval between the channel waveguides of the present invention. The reason why the channel waveguide interval $d_1$ between the slab connection sections 9 of the conventional AWG is that the channel waveguide interval $d_1$ spreads gradually; specifically, when the channel waveguide interval $d_1$ between the slab connection sections 9 is small, coupling between the channel waveguides in an area other than the slab connection sections 9 becomes larger.

In contrast, the present inventor has made the degree of spreading of the channel waveguide interval $d_1$ steep such that the channel waveguide interval $d_1$ between the slab connection sections 9 becomes small and such that the channel waveguide interval $d_1$ in an area other than the slab connection sections 9 becomes large.

In the S-shaped waveguide section 10a shown in FIG. 3, the curvature radii of the S-shaped waveguides "a" to "f" of the six channel waveguides "a" to "f" become gradually smaller from the shortest channel waveguide "f" toward the longest channel waveguide "a" in the six channel waveguides "a" to "f."

Moreover, in the S-shaped waveguide section 10b shown in FIG. 4, the curvature radii of the S-shaped waveguides "a" to "f" of the six channel waveguides "a" to "f" become gradually smaller from the longest channel waveguide "a" toward the shortest channel waveguide "f" in the six channel waveguides "a" to "f."

In addition, the S-shaped waveguide 20 (see FIG. 1; represents an area between the channel waveguide array 4 and the output slab 5) is also formed so as to assume the same structure as that of the S-shaped waveguide section 10 shown in FIG. 2, that of the S-shaped waveguide section 10a shown in FIG. 3, and that of the S-shaped waveguide section 10b shown in FIG. 4. Explanations about these structures overlap the explanation about the structure of the S-shaped waveguide section 10, and hence further repeated explanations are omitted.

Any of the neighborhoods of the six channel waveguides "a" to "f" may be provided with some or all of the S-shaped waveguides "a" to "f" having predetermined curvature radii, the linear portions, and a circular-arc portion having a predetermined curvature radius and a predetermined circular-arc angle.

FIGS. 5(d) and 5(e) are views showing geometrical patterns of the neighborhoods of the channel waveguides "a" to "f" according to the first embodiment of the present invention. The geometrical pattern shown in FIG. 5(d) is formed by combination of linear portions (linear sections) $L_1$, $L_2$, $L_3$, and $L_4$; S-shaped waveguides $S_1$, $S_2$ having predetermined curvature radii; and a circular-arc portion $R_1$ having a circular-arc curvature radius $\lambda_1$ and a circular-arc angle $\theta_1$.

The geometrical pattern shown in FIG. 5(e) is formed by combination of linear portions $L_5$, $L_6$; an S-shaped waveguide $S_3$ having a predetermined curvature radius; and a circular-arc portion $R_2$ having a circular-arc curvature radius $\lambda_2$ and a circular-arc angle $\theta_2$.

The optical path lengths of the respective channel waveguides "a" to "f" can be adjusted by varying the lengths of the linear portions $L_1$ to $L_4$, $L_5$, and $L_6$ and the curvature radius and circular-arc angle of the circular-arc waveguide. A phase difference having arisen in the S-shaped waveguides of the respective channel waveguides "a" to "f" is corrected, whereby a desired phase distribution can be obtained.

Accordingly, the geometrical patterns can be designed or manufactured with high accuracy and finely adjusted.

In the slab connection sections 9, the width of the S-shaped waveguides "a" to "f" can be changed.

Figure 6A:
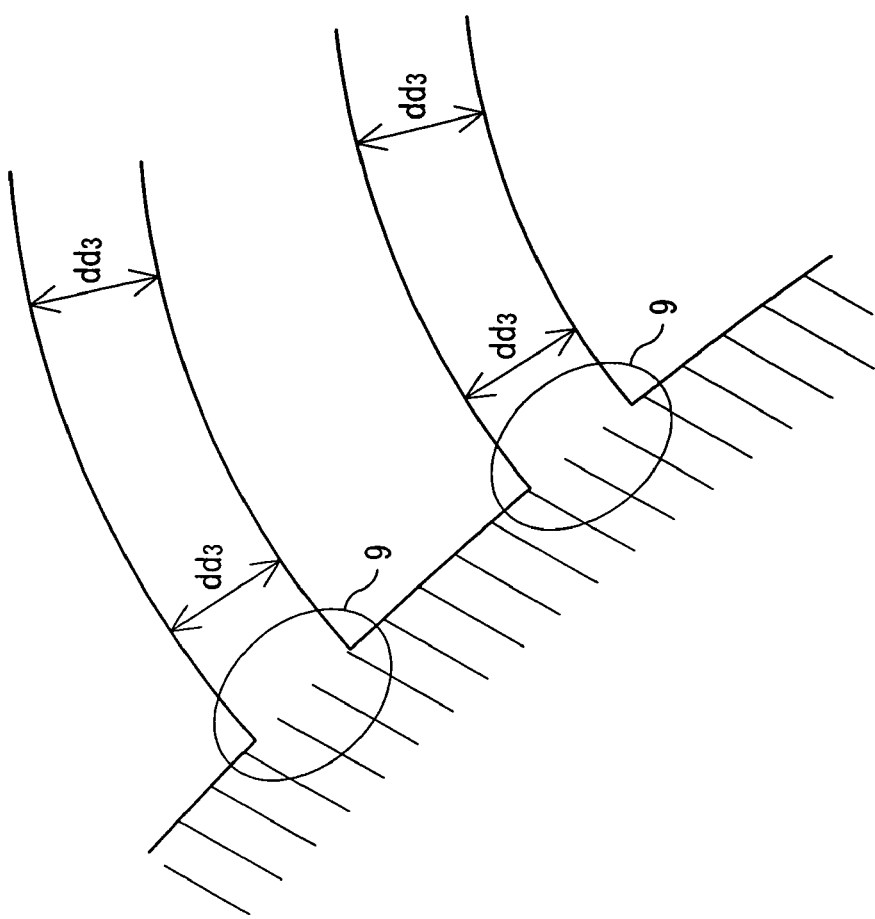
FIGS. 6(a) and 6(b) are views showing the geometry of an S-shaped waveguide according to the first embodiment of the present invention.
Figure 6B:
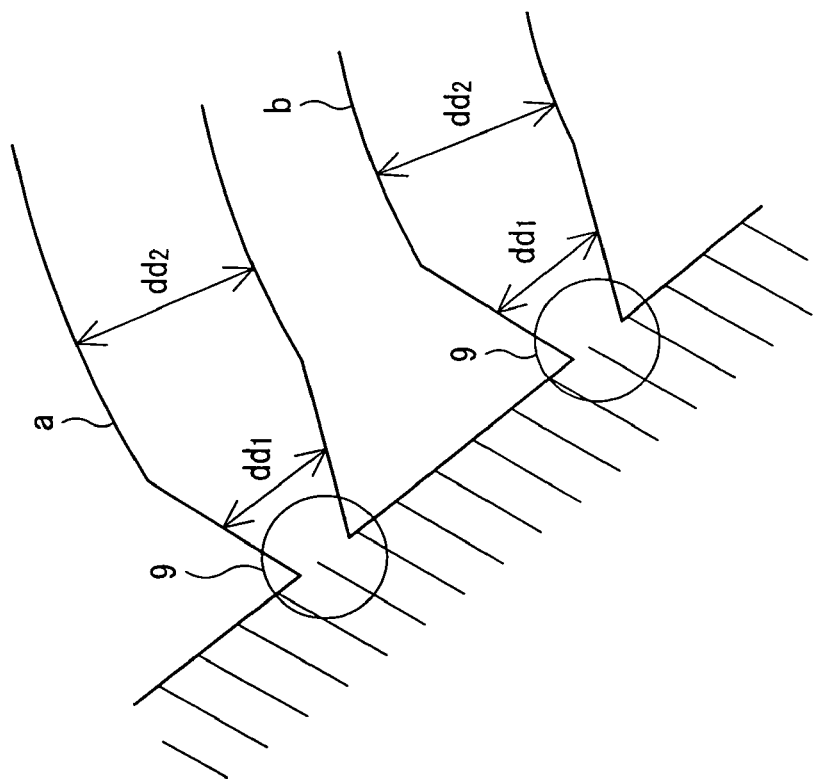

FIG. 6(a) is a view of geometries of the S-shaped waveguides "a" to "f" according to the first embodiment of the present invention, showing two S-shaped waveguides "a" and "b" acquired when widths of the S-shaped waveguides "a" to "f" are changed in accordance with the positions of the S-shaped waveguides "a" to "f" (hatched lines shown in FIGS. 6(a) and 6(b) designate the input slab 3 or the output slab 5). The widths of the S-shaped waveguides "a" and "b" shown in FIG. 6(a) are narrow at the slab connection sections 9 corresponding to the bases of the channel waveguides "a" and "b." However, the widths of circular-arc portions of the S-shaped waveguides "a" and "b" facing the input slab 3 or the output slab 5 become gradually larger toward the propagation direction of the wavelength-multiplexed lights #1 to #6. Here, $dd_1$ and $dd_2$ represent widths of the S-shaped waveguides "a" and "b" and assume a relationship of $dd_2 > dd_1$. The geometries of the S-shaped waveguides "c" to "f" are also the same as those of the S-shaped waveguides "a" and "b."

Therefore, the distance between the S-shaped waveguides "a" and "b" in the slab connection sections 9 becomes greater, and hence occurrence of crosstalk or the like can be prevented in a more reliable manner.

FIG. 6(b) is a view of geometries of the S-shaped waveguides "a" to "f" according to the first embodiment of the present invention, showing any two of the S-shaped waveguides "a" to "f" acquired when widths of the S-shaped waveguides "a" to "f" remain constant in accordance with the positions of the S-shaped waveguides "a" to "f." The S-shaped waveguides "a" and "b" shown in FIG. 6(b) are formed so as to assume a constant width $dd_3$ in the slab connection sections 9 corresponding to the bases of the six channel waveguides "a" to "f" as well as in areas other than the slab connection sections 9. The geometries of the S-shaped waveguides "c" to "f" are analogous to those of the S-shaped waveguides "a" and "b."

Thereby, the widths of the channel waveguides "a" and "b" in the slab connection sections 9 become essentially identical with those of areas of the channel waveguides "a" and "b" spaced from the slab connection sections 9. Hence, the channel waveguides "a" to "f" in the slab connection sections 9 can be formed without use of a tapered waveguide.

Here, the expression "taper" means that the geometry of the channel waveguide array 4 becomes gradually narrower at an end where light arrives or that the geometry of an end becomes gradually thin.

As mentioned above, in the AWG 1 of the present invention, the plurality of waveguide sections 10, 20 whose shapes differ from each other in terms of degree of bending are formed, in the respective channel waveguides "a" to "f," in the vicinity of the area where the channel waveguide 4 is connected to the input slab 3 and in the vicinity of the area where the channel waveguide array 4 is connected to the output slab 5.

Moreover, as mentioned previously, the channel waveguide intervals $\delta_1$ to $\delta_6$ in the areas other than the respective slab connection sections 9 are made wider than the waveguide interval $d_1$ in the respective slab connection sections 9 (see FIGS. 2 to 4). Consequently, according to the AWG 1 of the present invention, a compact AWG 1 can be obtained without involvement of deterioration of characteristics, which would otherwise be caused by coupling between the channel waveguides in areas other than the slab connection sections 9.

By way of an example, provided that the number "n" of the channel waveguides is taken as 200 and that the minimum curvature radii of the S-shaped waveguides 10, 20 are set to 6 mm, the length required to broaden the channel waveguide interval $d_1$ of 10 μm in the slab connection sections 9 to 20 μm by the S-shaped waveguides 10, 20 is about 3 mm. The slab length $f_1$ achieved at this time becomes 12 mm. Hence, the chip length of the AWG can be shortened by about 18 mm when compared with the conventional AWG (having, e.g., a channel waveguide interval $d_1$ of 20 μm in the slab connection section 9 and a slab length $f_1$ of 24 mm).

In the AWG 1 of the present invention, any area where a channel waveguide is provided can be provided with the S-shaped waveguide sections 10, 20. Specifically, the six channel waveguides "a" to "f" are spaced from each other at an interval required to prevent occurrence of optical interference between the respective channel waveguides "a" to "f" in some or all of the neighborhoods; that is, first neighborhoods of the channel waveguides "a" to "f" connected to the input slab 3; second neighborhoods of the channel waveguides "a" to "f" connected to the output slab 5; a third neighborhood of the input waveguide 2 connected to the input slab 3; and a fourth neighborhood of the output waveguide 6 connected to the output slab 5.

Even in the second embodiment to be described later, the only requirement to shorten the length required to convert the waveguide interval in the slab connection sections 9 into the waveguide interval at a fiber connection end of the output waveguide 6 is to form S-shaped waveguides having different curvature radii in the vicinity of the slab connection sections 9 for the respective output waveguides 6.

Example WDM transmission using the AWG 1 will be described in detail by reference to FIG. 7.

Figure 7:
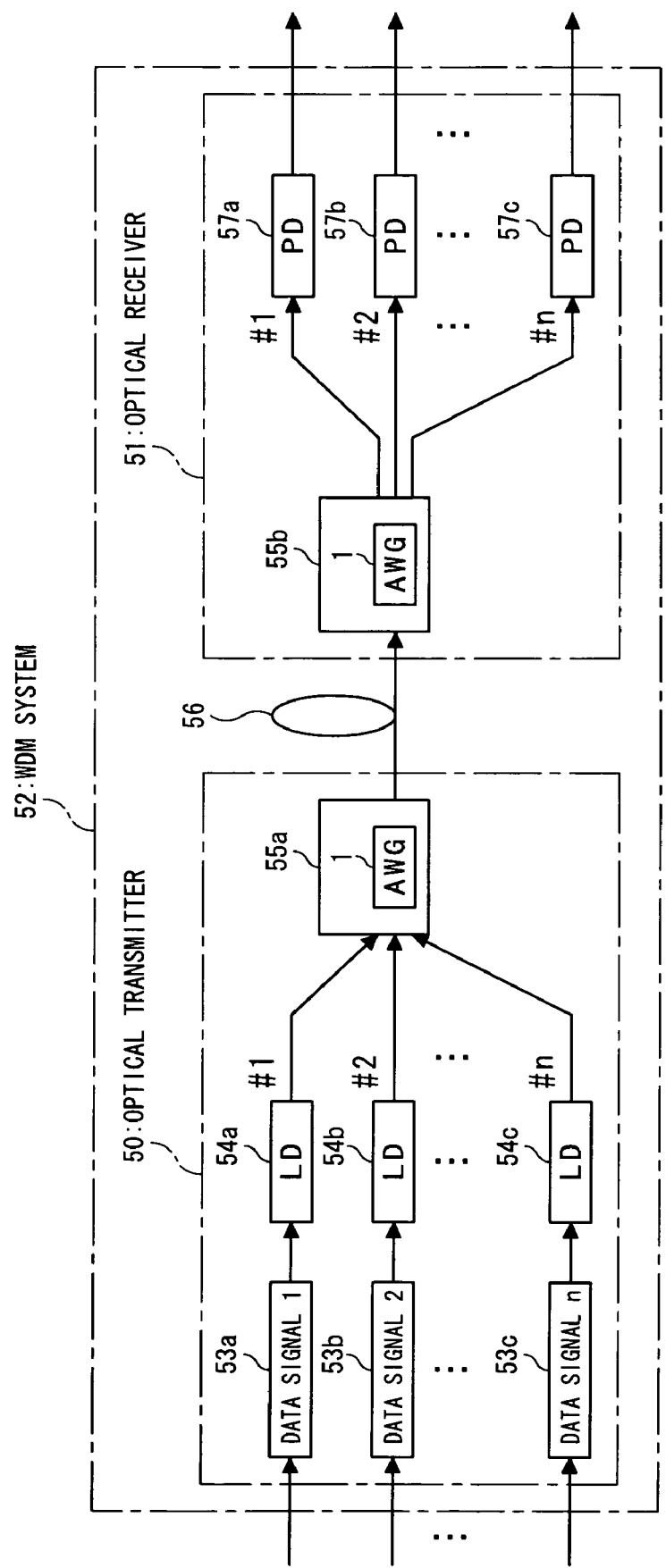
FIG. 7 is a view showing the principal section of a WDM system according to the first embodiment of the present invention.

FIG. 7 is a view showing the principal section of a WDM system according to the first embodiment of the present invention. A WDM system 52 shown in FIG. 7 comprises an optical transmitter 50 for transmitting wavelength-multiplexed light; an optical fiber 56 for transmitting the wavelength-multiplexed light; and an optical receiver 51 for receiving the wavelength-multiplexed light. The optical transmitter 50 comprises "n" data signal generation sections 53a to 53c for outputting data signals including information signals; "n" laser diodes (LDs) 54a to 54c which subject the data signals outputted from the data signal generation sections 53a to 53c to optical modulation and output single lights #1 to #n having different wavelengths; and a multiplexing section 55a which has the AWG 1 and multiplexes the signal lights #1 to #n outputted from the laser diodes 54a to 54c.

The data signal generation sections 53a to 53c interactively operate with the laser diodes 54a to 54c, to thus function as an optical signal output section. The multiplexing section 55a multiplexes the optical signals of "n" types outputted from the optical signal output section (the data signal generation sections 53a to 53c and the laser diodes 54a to 54c) to thus output wavelength-multiplexed lights #1 to #n, and hence functions as an AWG (arrayed waveguide division multiplexing apparatus).

Consequently, the multiplexing section 55a comprises, all on the substrate 1, the input waveguide 2 for propagating and outputting the wavelength-multiplexed light into which lights of, e.g., six types of wavelengths, are multiplexed; the input slab 3 for spreading the wavelength-multiplexed lights #1 to #6 outputted from the input waveguide 2; the channel waveguide array 4 which has the six channel waveguides "a" to "f" of, e.g., different lengths, separates the wavelength-multiplexed lights "a" to "f" spread by the input slab 3 according to six types of wavelengths, and causes the thus-separated lights to propagate; the output slab 5 for gathering the six types of separated lights propagated by way of the channel waveguide array 4; and the output waveguides 6 in the number of, e.g., six, for propagating the light gathered by the output slab 5. The multiplexing section is configured such that the waveguide interval between the neighborhoods (first neighborhoods) of the respective channel waveguides "a" to "f" connected to the input slab 3 and the neighborhoods (second neighborhoods) of the respective channel waveguides "a" to "f" connected to the output slab 5 becomes broader than the waveguide interval achieved in the area where the channel waveguide array 4 is connected to the input slab 3 or the waveguide interval achieved in the area where the channel waveguide array 4 is connected to the output slab 5.

Therefore, by means of these configurations, the packaging density of hardware components is increased by miniaturization, cost reduction can be promoted, and utilization of wavelength division multiplexing is expanded.

Further, the optical fiber 56 is a transmission path for transmitting the wavelength-multiplexed lights #1 to #n.

The optical receiver 51 is formed from a wavelength division section 55b which has the AWG 1, subjects the wavelength-multiplexed lights #1 to #n received by way of the optical fiber 56 to wavelength division, and outputs the single lights #1 to #n; and photodiodes (PD) 57a to 57c for detecting the single lights #1 to #n outputted from the wavelength division section 55b.

The optical transmitter 50 and the optical receiver 51 each act as the optical transmission apparatus of the present invention.

By means of such a configuration, an information signal into which data, such as motion picture data, are framed is subjected to transmission processing in the data signal generation sections 53a to 53c, and the data signals having undergone transmission processing are optical modulated by the laser diodes 54a to 54c. The thus-optically-modulated signals are input to the output waveguide 6 (see FIG. 1) of the AWG 1 provided in the multiplexing section 55a, and the wavelength-multiplexed lights #1 to #n are outputted from the input waveguide 2 of the AWG 1. The wavelength-multiplexed lights #1 to #n are transmitted over the optical fiber 56 (see FIG. 7) and input to the wavelength division section 55b of the optical receiver 51.

The input waveguide 2 shown in FIG. 1 causes the input wavelength-multiplexed lights #1 to #6 to propagate and transmits the lights to the input slab 3. The input slab 3 having the light distribution function has a shape spreading in a direction parallel to the substrate 1 and does not confine but horizontally spreads the wavelength-multiplexed lights #1 to #6. The thus-spread wavelength-multiplexed lights #1 to #6 are in phase with each other and enter the six channel waveguides "a" to "f" in the form of an array. Here, the wavelength-multiplexed lights #1 to #6 pass through the S-shaped waveguide sections 10, 20 that are plotted such that the curvature radii of the respective channel waveguides become gradually smaller. The respective optical beams interfere with each other in the respective channel waveguides and are output to the output waveguide 6 by way of the output slab 5. After passage through the waveguide sections, the wavelength-multiplexed lights #1 to #6 are provided with equiphase wave surfaces which change from one wavelength to another.

The wavelength-multiplexed lights #1 to #6 are gathered by the output slab 5 into the center of the circular arc of the slab boundary line. One end of the output waveguide 6 is situated at the position where the light of desired wavelength is gathered, and the other end of the same is used as an output terminal. An input terminal of the optical fiber or another optical component is connected to this output terminal.

Next, the way of miniaturizing the AWG 1 to which the present invention is applied will now be described by reference to FIGS. 8, 9(a), and 9(b). Of the reference numerals provided in FIGS. 8, 9(a), and 9(b), elements assigned the same reference numerals as elements described previously are identical with the previously-described elements. In the following descriptions, a chip means the substrate 1 on which waveguides are formed or a substrate on which no waveguides are formed.

FIG. 8 is a view for describing miniaturization of the AWG 1 according to the first embodiment of the present invention. The slab length $f_1$ is shortened by reducing the channel waveguide interval $d_1$ in the S-shaped waveguide sections 10, 20 shown in FIG. 8. In the AWG 1, when compared with the area where no S-shaped waveguides sections 10, 20 are provided (indicated by broken lines), the S-shaped waveguides "a" to "f" become shorter. Contribution to miniaturization derived from shortening of the slab length $f_1$ is great, and hence a chip size; that is, the entire AWG 1, is reduced in size.

The degree of miniaturization of the chip size will now be described by reference to FIGS. 9(a) and 9(b).

Figure 9A:
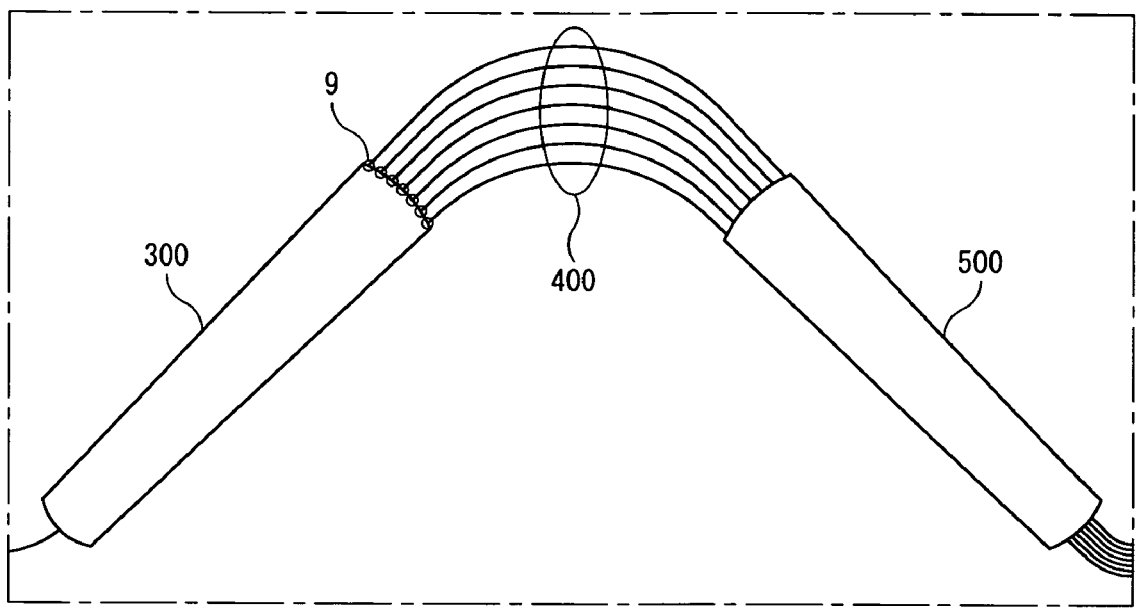
FIG. 9(a) is a view showing an example chip size of a conventional AWG.

FIG. 9(a) is a view showing an example chip size of the conventional AWG. FIG. 9(b) is a view showing an example chip size of the AWG 1 according to the first embodiment of the present invention. Those elements assigned the same reference numerals as elements those shown in FIGS. 9(a), 9(b) are the same elements or have the same functions as those of the previously-described elements. Hence, additional explanations are omitted.

When compared with the waveguide in which a difference $\Delta n$ of specific refraction between the core and clad of the channel waveguide is 0.75%, the channel waveguide interval $d_1$ in the slab connection sections 9 of the AWG shown in FIG. 9(a) is 20 μm, and the slab length $f_1$ is 24 mm. As a result, the lengths of the S-shaped waveguide sections 10, 20 are shortened to about 3 mm, and the slab length $f_1$ on one side is shortened by about 9 mm. Slab lengths on both sides are shortened by about 18 mm, and one side of the chip is miniaturized to about (1¼).

Figure 9B:
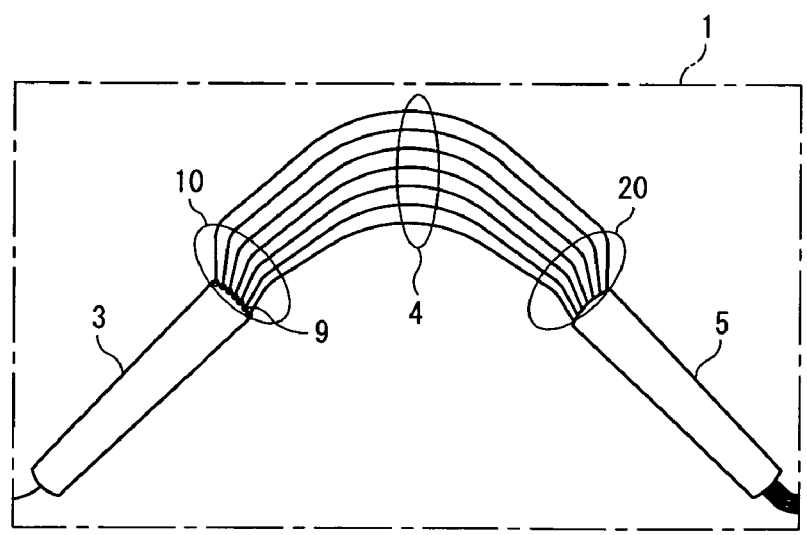
FIG. 9(b) is a view showing an example chip size of an AWG according to the fist embodiment of the present invention.

Consequently, the chip area of the AWG 1 shown in FIG. 9(b) becomes about half the chip area of the AWG shown in FIG. 9(a). Therefore, the number of chips per unit wafer is increased, thereby realizing cost cutting of the chip. Moreover, since the area of the entire chip is reduced, a loss in waveguide is also diminished. By way of an example, when a transmission loss is 0.1 dB/cm, an effect of reduction of about 0.3 dB is achieved.

By means of making the channel waveguide intervals δ1 to δ6 (see FIGS. 2 to 4) narrow, a mode conversion loss in the slab connection sections 9 of the channel waveguides "a" to "f" (or "h" to "l") can be diminished. An effect of reduction of about 0.5 dB can be obtained as an example. Moreover, as a result of the reduction effects being summated, an effect of reduction of about 0.8 dB can be obtained in the entire chip.

Modifications using the S-shaped waveguides 10, 20 shown in FIGS. 3 and 4 will now be described. In the modifications to be described below, elements assigned the same reference numerals as elements described previously are the same elements or have the same functions as those of the previously-described elements.

Figure 10:
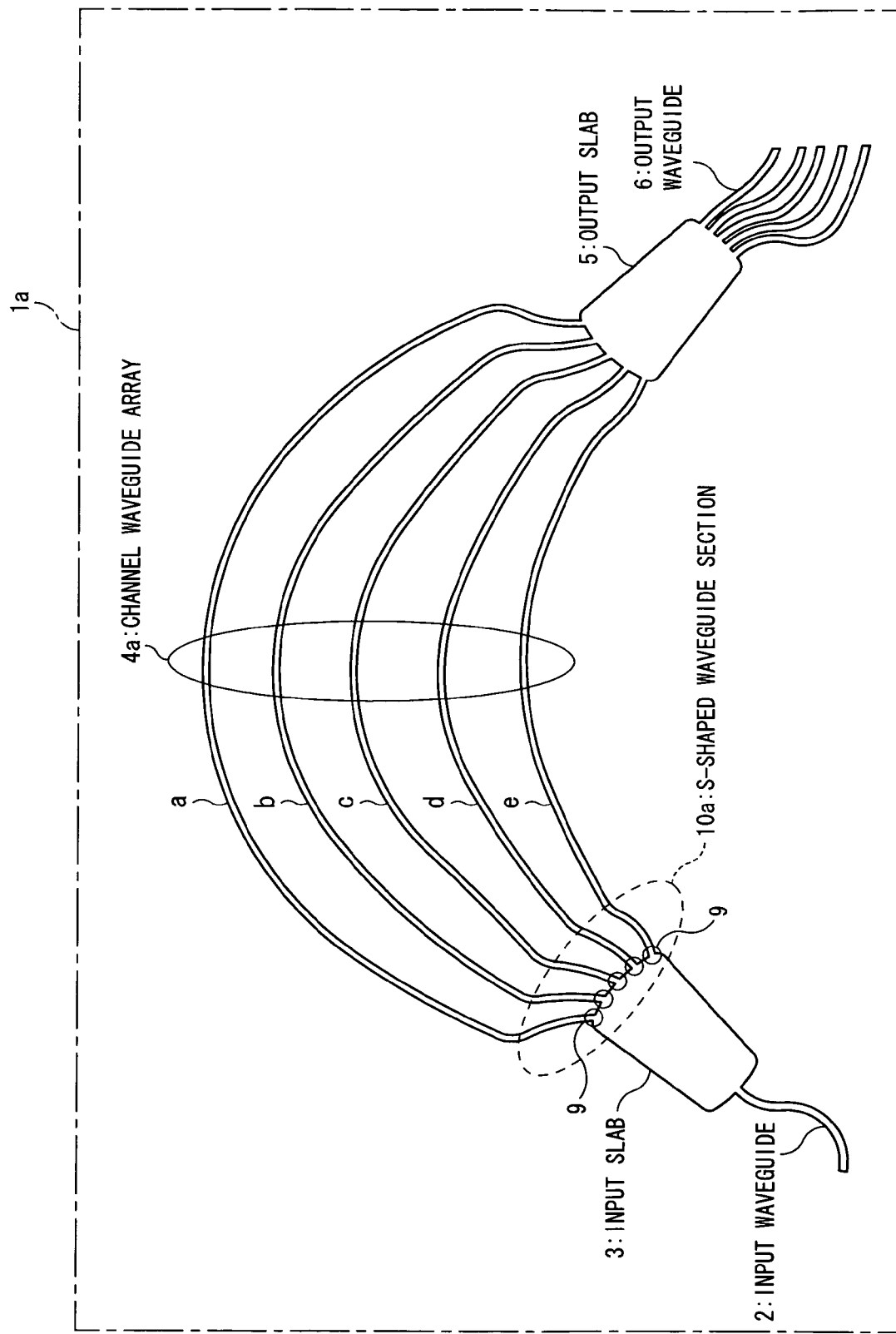
FIG. 10 is a block diagram of an AWG according to a first modification of the first embodiment of the present invention.

FIG. 10 is a block diagram of an AWG according to a first modification of the first embodiment of the present invention. An AWG 1a shown in FIG. 10 comprises the input waveguide 2, the output waveguide 6, the input slab 3 for performing the function of distributing and gathering light, the output slab 5, and an arrayed channel waveguide 4a in which five channel waveguides "a" to "e" are arranged. The channel waveguide 4a has an S-shaped waveguide section 10a (see FIG. 3).

This S-shaped waveguide section 10a is formed such that the curvature radii of the respective channel waveguides "a" to "e" become gradually smaller from the shortest channel waveguide "e" to the longest channel waveguide "a" in the vicinity of the slab connections 9 existing between the input slab 4 and the channel waveguide array 4a.

By way of an example, on the assumption that the number N of channel waveguides (N denotes a natural number) is 200 and that the minimum curvature radius used for the S-shaped waveguide section 10a is 6 mm, the length (the length of the channel waveguide array 4a) required to broaden a channel waveguide interval $d_1$ of 10 μm in the slab connection sections 9 to a channel waveguide interval $d_1$ of 20 μm by means of formation of the S-shaped waveguide section 10a is about 4 mm. In this case, the slab length $f_1$ achieved at this time has become 12 mm, and hence the chip length can be shortened by 16 mm when compared with the conventional AWG (having a channel waveguide interval $d_1$ of 20 μm in the slab connection sections 9 and a slab length $f_1$ of 24 mm).

Figure 11:
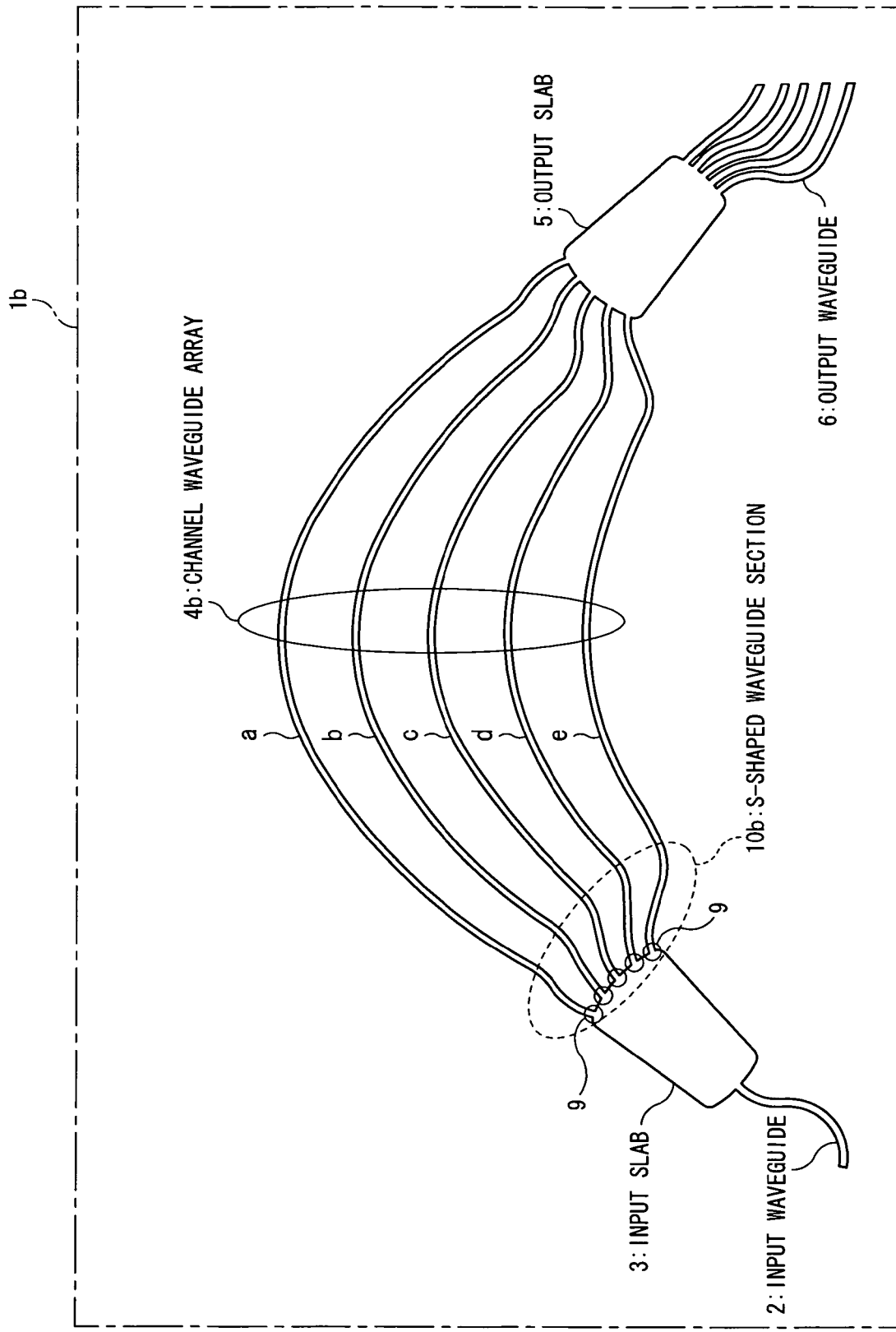
FIG. 11 is a block diagram of an AWG according to a second modification of the first embodiment of the present invention.

FIG. 11 is a block diagram of an AWG according to a second modification of the first embodiment of the present invention. An AWG 1b shown in FIG. 11 comprises the input waveguide 2, the output waveguide 6, the input slab 3 for performing the function of distributing and gathering light, the output slab 5, and an arrayed channel waveguide 4b in which five channel waveguides "a" to "e" are arranged. The channel waveguide 4b has an S-shaped waveguide section 10b shown in FIG. 4.

This S-shaped waveguide section 10b is formed such that the curvature radii of the respective channel waveguides "a" to "e" become gradually smaller from the longest channel waveguide "a" to the shortest channel waveguide "e" in the vicinity of the slab connections 9 existing between the input slab 3 and the channel waveguide array 4b.

On the assumption that the number N of channel waveguides is 200 and that the minimum curvature radius used for the S-shaped waveguide section 10b is 6 mm, the length of the channel waveguide array 4b required to broaden a channel waveguide interval $d_1$ of 10 μm in the slab connection sections 9 to a channel waveguide interval $d_1$ of 20 μm by means of formation of the S-shaped waveguide section 10b is about 4 mm. In this case, the slab length $f_1$ becomes 12 mm, and hence the chip length of the AWG 1b can be shortened by 16 mm when compared with the conventional AWG (having a channel waveguide interval $d_1$ of 20 μm in the slab connection sections 9 and a slab length $f_1$ of 24 mm).

The input waveguides 2 of the AWGs 1a, 1b may be provided with a plurality of waveguides; e.g., six waveguides. In addition, the output waveguide 6 may be provided with only one waveguide.

As mentioned above, according to the AWGs 1, 1a, and 1b of the present invention, there can be obtained an AWG which enables reduction of a chip size and cost and has a high waveguide characteristic such as a reduction in loss.

By means of miniaturization, hardware, such as a relay station, a terminal, and an optical switch for WDM, can be miniaturized, thereby realizing an attempt to cut costs.

By means of this, the packaging density of respective components of WDM can be increased, and hence cost cutting can be promoted, and characteristics pertaining to optical branching and optical multiplexing can be maintained or enhanced.

(B) Descriptions of a Second Embodiment of the Present Invention

In the first embodiment, the locations where the S-shaped waveguides 10, 20 are formed are in the vicinity of the areas of the channel waveguides "a" to "f" connected to the input slab 3. However, the areas may be changed. In the second embodiment, the S-shaped waveguide section is provided in the input waveguide 2 of the AWG.

Figure 12:
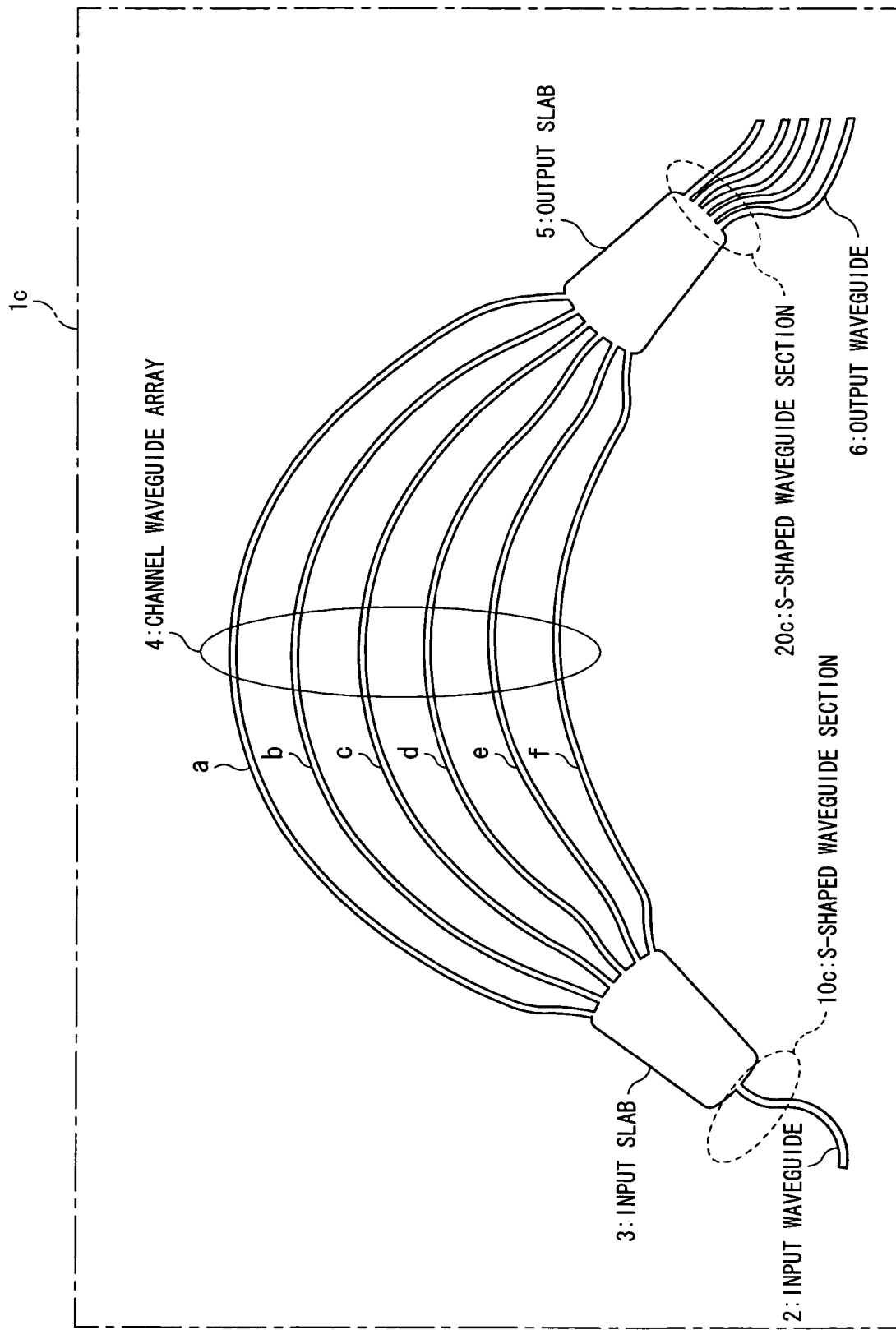
FIG. 12 is a block diagram of an AWG according to a second embodiment of the present invention.
Figure 13:
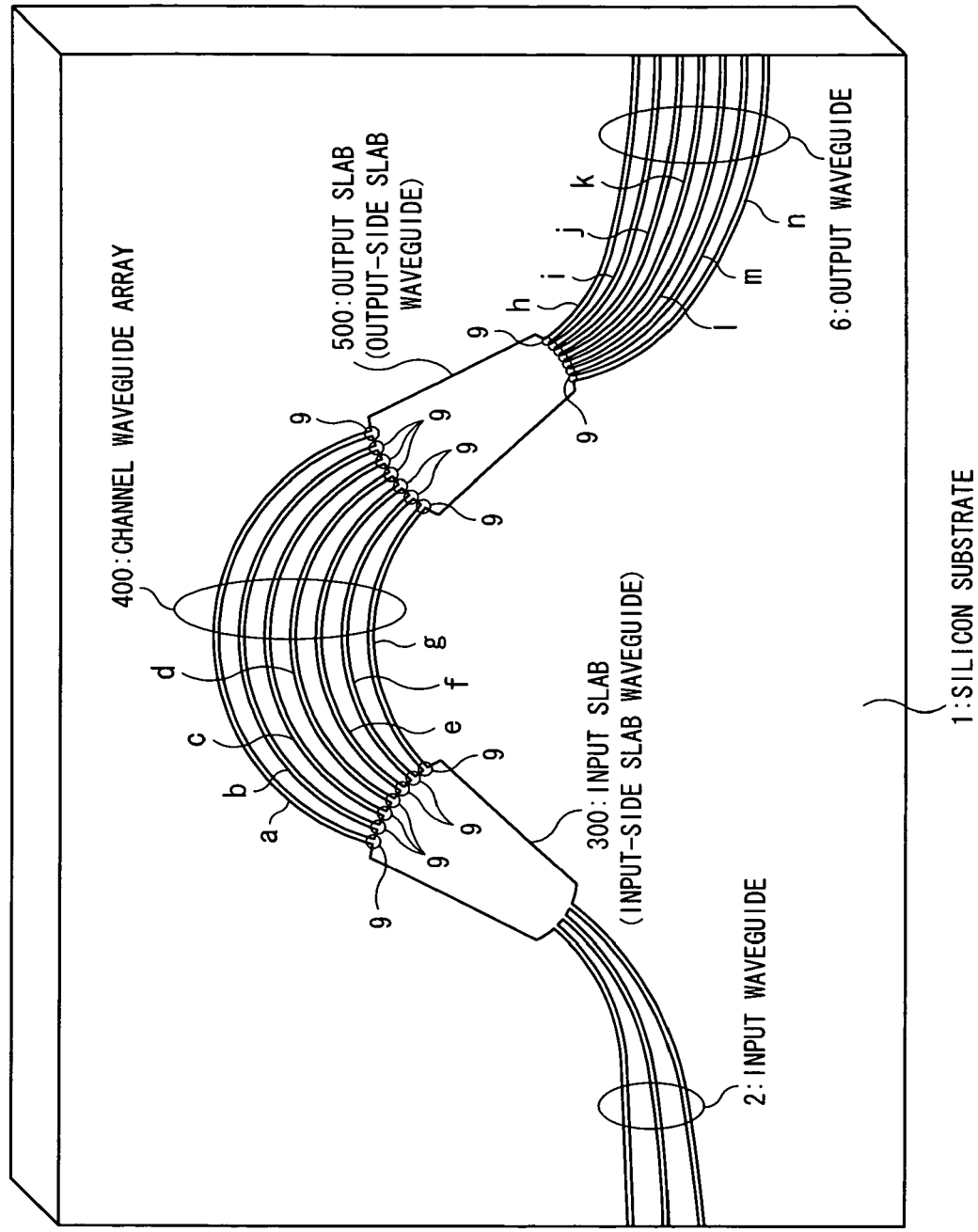
FIG. 13 is a block diagram of the AWG.
Figure 16:
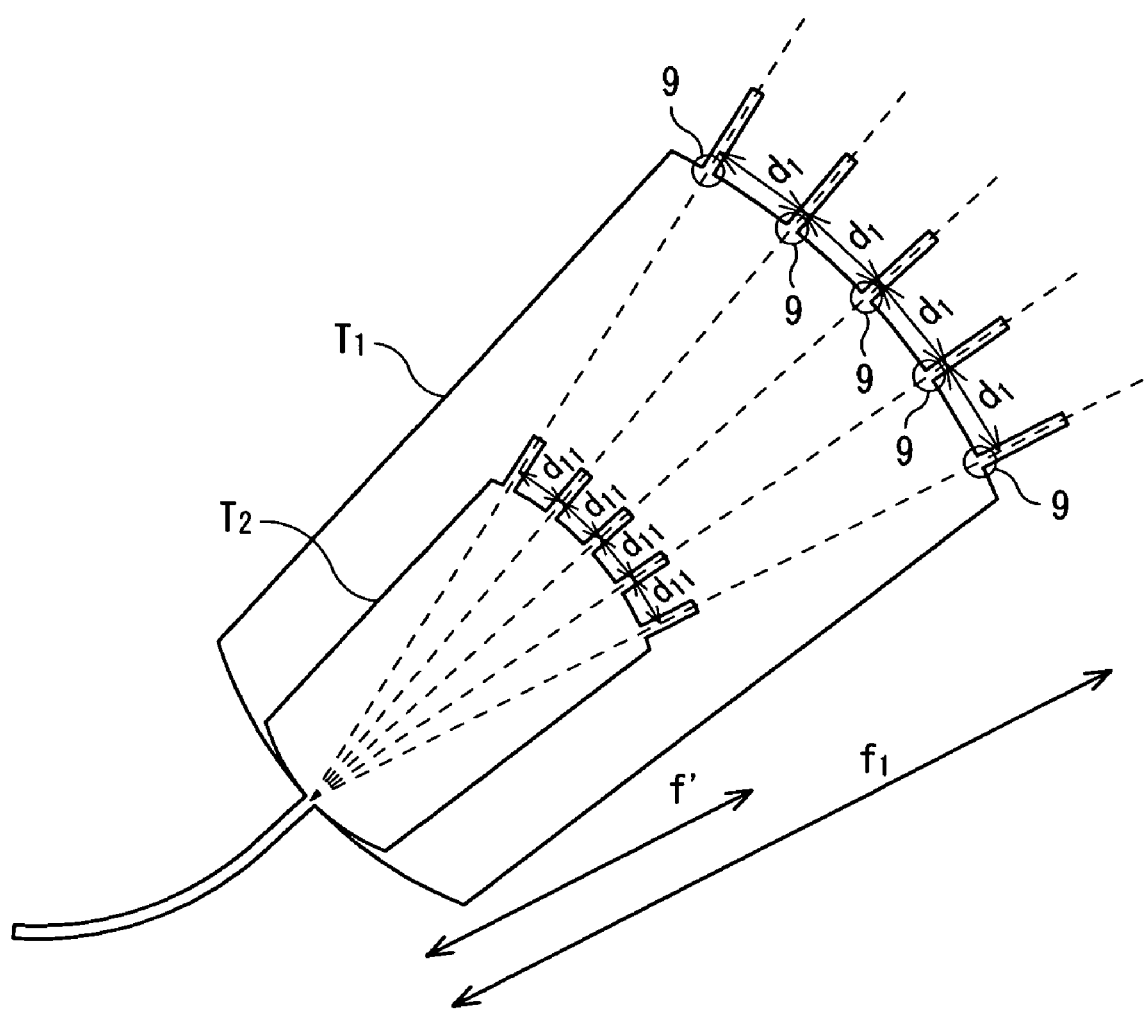
FIG. 16 is a view for describing a relationship between a channel waveguide interval and slab length in a slab section.

FIG. 12 is a block diagram of an AWG according to the second embodiment. An AWG 1c shown in FIG. 12 is formed such that the channel waveguide interval $d_1$ in the neighborhood of an area of the input waveguide 2 connected to the input slab 3 becomes wider than the channel waveguide interval $d_1$ in the area of the input waveguide 2 connected to the input slab 3 (the third connection section). The AWG 1c is formed such that the channel waveguide interval $d_1$ in the neighborhood of an area of the output waveguide 6 connected to the output slab 5 becomes wider than the channel waveguide interval $d_1$ in the area of the input waveguide 2 connected to the output slab 5 (the fourth connection section).

The neighborhood of the input waveguide 2 or that of the output waveguide 6 is formed so as to bend from the center channel waveguide "c" (or "d") toward the outer channel waveguide "a" (or "f") (see FIGS. 2 to 4). More specifically, the AWG has a plurality of waveguide sections 10d whose geometries differ from each other in terms of degree of bending, for each input waveguide 2 or output waveguide 6.

Even in the second embodiment, the curvature radii of the S-shaped waveguides of the input waveguide 2 or the output waveguide 6 may be formed so as to become smaller from the center waveguide toward an outer waveguide in the input waveguide 2 or the output waveguide 6.

Similarly, the curvature radii of the S-shaped waveguides of the input waveguide 2 or the output waveguide 6 may be formed such that the lengths of the input waveguide 2 or the output waveguide 6 becomes smaller from the shortest channel waveguide toward the longest channel waveguide.

Moreover, the geometrical patterns of the neighborhoods of the channel waveguides "a" to "e" can also be formed through use of patterns shown in FIGS. 5(d), 5(e).

Accordingly, in the AWG 1c of the present invention, the areas where channel waveguides are provided can be provided with the S-shaped waveguide sections 10c, 10d. Specifically, the six channel waveguides "a" to "f" are spaced apart from each other at an interval required to prevent occurrence of interference between the respective channel waveguides "a" to "e" in a portion or all of the third neighborhood of the input waveguide 2 connected to the input slab 3 and the fourth neighborhood of the output waveguide section 6 connected to the output slab 5.

Even in the second embodiment, in order to shorten the length required to convert the waveguide interval $d_1$ in the slab connection sections 9 of the output waveguide 6 into the waveguide interval at the end of the output waveguide 6 connected to the fiber, the only requirement is to form the S-shaped waveguide sections having different curvature radii in the vicinity of the slab connection sections 9.

The input waveguide 2 of the AWG 1c may be provided with a plurality of waveguides; e.g., six waveguides. Moreover, the output waveguide 6 may be provided with only one waveguide.

As mentioned above, according to the AWGs 1b, 1c of the present invention, there can be obtained an AWG which enables reduction of a chip size and cost and has a high waveguide characteristic such as a low loss.

(C) Others

The present invention is not limited to the previously-described embodiments and can be carried out in various modified forms within the scope of the present invention.

Fields which the AWGs 1, 1a, 1b, and 1c of the present invention can be applied includes a multiplexing device provided at an access portion of an optical transmission system, an optical relay, a terminal device, an optical switch provided in a optical transmission system, ADM, or the like. An optical cross connect is for converting wavelengths or time slots of a plurality of time-multiplexed channels through use of a plurality of wavelength-multiplexed lights. As a result, the present invention can contribute to enhancement of transmission characteristics of wavelength-multiplexed light in connection with an SONET (Synchronous Optical Network) or an SDH (Synchronous Digital Hierarchy).

Industrial Applicability

As mentioned above, according to the present invention, the AWG can be miniaturized, whereby a chip size is reduced, and the number of chips per unit wafer is increased. Accordingly, costs of a chip can be reduced, thereby significantly contributing to efficiency of mass production. Moreover, as a result of a reduction in chip size, a loss in a waveguide is diminished, thereby lessening a loss in a slab connection section. Further, the packaging density of respective hardware components is increased, and cost cutting can be promoted. Thereby, utilization of wavelength division multiplexing is expanded.

What is claimed is:

1. An arrayed waveguide-type wavelength multiplexing/demultiplexing device comprising, on a substrate;
   one or a plurality of input waveguides for propagating and outputting wavelength-multiplexed light multiplexed with a plurality of wavelengths;
   a first slab for diffusing said wavelength-multiplexed light outputted from said input waveguide;
   a channel waveguide array, which has a plurality of channel waveguides of different lengths for separating the wavelength-multiplexed light, diffused by said first slab according to said plurality of wavelengths, into a plurality of separated lights and causing said separated lights to propagate;
   a second slab for condensing said plurality of separated lights having propagated through said channel waveguide array; and
   one or a plurality of output waveguides for causing said lights condensed by said second slab to propagate, wherein
   a waveguide interval in at least either first neighborhoods of said respective channel waveguides to be connected to said first slab or second neighborhoods of said respective channel waveguides to be connected to said second slab is set to become wider than a first waveguide interval in a first connection section for connecting, said channel waveguide array to said first slab or as second waveguide interval in a second connection section for connecting said channel waveguide array to said second slab,
   said first or second neighborhood of at least one of said plurality of channel waveguides is formed from a plurality of waveguides having geometries of different degrees of flex for said respective channel waveguides, and
   curvature radii of respective S-shaped waveguides serving as said plurality of channel waveguides are made smaller from a center channel waveguide of said plurality of channel waveguides toward an outer channel waveguide.

2. An arrayed waveguide-type wavelength multiplexing/demultiplexing device comprising, on a substrate;
   one or a plurality of input waveguides for propagating and outputting wavelength-multiplexed light multiplexed with a plurality of wavelengths;
   a first slab for diffusing said wavelength-multiplexed light outputted from said input waveguide;
   a channel waveguide array, which has a plurality of channel waveguides of different lengths for separating the wavelength-multiplexed light, diffused by said first slab according to said plurality of wavelengths, into a plurality of separated lights and causing said separated lights to propagate;
   a second slab for condensing said plurality of separated lights having propagated through said channel, waveguide array; and
   one or a plurality of output waveguides for causing said lights condensed by said second slab to propagate, wherein
   a waveguide interval in at least either first neighborhoods of said respective channel waveguides to be connected to said first slab or second neighborhoods of said respective channel waveguides to be connected to second slab is set to become wider than a first waveguide interval in a first connection section for connecting, said channel waveguide array to said first slab or a second waveguide interval in a second connection section for connecting said channel waveguide array to said second slab, said first or second neighborhood of at least one of said plurality of channel waveguides is formed from a plurality of waveguides having geometries of different degrees of flex for said respective channel waveguides, and, curvature radii of respective S-shaped waveguides serving as said plurality of channel waveguides are made smaller from a shortest channel waveguide toward a longest channel waveguide of said plurality of channel waveguides or from said longest channel waveguide toward said shortest channel waveguide.

3. An arrayed waveguide-type wavelength multiplexing/demultiplexing device comprising, on a substrate;

one or a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths for separating the wavelength-multiplexed light, diffused by said first slab according to said plurality of wavelengths, into a plurality of separated lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either first neighborhoods of said respective channel waveguides to be connected to said first slab or second neighborhoods of said respective channel waveguides to be connected to said second slab is set to become wider than a first waveguide interval in a first connection section for connecting, said channel waveguide array to said first slab or a second waveguide interval in a second connection section for connecting said channel waveguide array to said second slab, said first or second neighborhood of at least one of said plurality of channel waveguides is formed from a plurality of waveguides having geometries of different degrees of flex for said respective channel waveguides, and widths of respective S-shaped waveguides serving as said plurality of channel waveguides are narrow at a slab connection section corresponding to bases of said plurality of channel waveguides and become wider at circular-arc portions of said S-shaped waveguides facing said first or second slab toward a propagating direction of said wavelength-multiplexed light.

4. An arrayed waveguide-type wavelength multiplexing/demultiplexing device comprising, on a substrate;

one of a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths for separating the wavelength-multiplexed light, diffused by said first slab according to said plurality of wavelengths into a plurality of separated lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either first neighborhoods of said respective channel waveguides to be connected to said first slab or second neighborhoods of said respective channel waveguides to be connected to said second slab is set to become wider than a first waveguide interval in a first connection section for connecting, said channel waveguide array to said first slab or a second wave guide interval in a second connection section for connecting said channel, wave wide array to said second slab, said first or second neighborhood of at least one of said plurality of channel waveguides is formed from a plurality of waveguides having geometries of different degrees of flex for said respective channel waveguides, and widths of respective S-shaped waveguides serving as said plurality of channel waveguides achieved in a slab connection section corresponding to bases of said plurality of channel waveguides become equal to widths of said S-shaped waveguides other than said slab connection section.

5. An arrayed waveguide-type wavelength multiplexing/demultiplexing device comprising, on a substrate;

one or a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths, for separating the wavelength-multiplexed light, diffused by said first slab according to said plurality of wavelengths, into a plurality of separated lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either third neighborhoods of said respective input waveguides to be connected to said first slab or fourth neighborhoods of said respective output waveguides to be connected to said second slab is set to become wider than a third waveguide interval in a third connection section for connecting said input waveguide array to said first slab or a fourth waveguide interval in a fourth connection section for connecting said output waveguide array to said second slab, said third neighborhoods of said input waveguides or said fourth neighborhoods of said output waveguides are provided with a plurality of waveguides having geometries of different degrees of flex for said respective input or output waveguides, and curvature radii of respective S-shaped waveguides serving as said plurality of channel waveguides are made smaller from a center waveguide of said input or output waveguides toward an outer waveguide.

6. The arrayed waveguide-type wavelength multiplexing/demultiplexing device according to claim 5, wherein the curvature radii of respective S-shaped waveguides serving as said plurality of channel waveguides are made smaller from a shortest channel waveguide toward a longest channel waveguide of said input or output waveguides.

7. The arrayed waveguide-type wavelength multiplexing/demultiplexing device according to claim 1, wherein said first or second neighborhood of at least one of said plurality of channel waveguides is formed to bend in a direction from a center channel waveguide of said plurality of channel waveguides to an outer channel waveguide.

8. The arrayed waveguide-type wavelength multiplexing/demultiplexing device according to claim 2, wherein said first or second neighborhood of at least one of said plurality of channel waveguides is formed to bend in a direction from a center channel waveguide of said plurality of channel waveguides to an outer channel waveguide.

9. The arrayed waveguide-type wavelength multiplexing/demultiplexing device according to claim 3, wherein said first or second neighborhood of at least one of said plurality of channel waveguides is formed to bend in a direction from a center channel waveguide of said plurality of channel waveguides to an outer channel waveguide.

10. The arrayed waveguide-type wavelength multiplexing/demultiplexing device according to claim 4, wherein said first or second neighborhood of at least one of said plurality of channel waveguides is formed to bend in a direction from a center channel waveguide of said plurality of channel waveguides to an outer channel waveguide.

11. The arrayed waveguide-type wavelength multiplexing/demultiplexing device according to claim 1, wherein a neighborhood of at least one of said plurality of channel waveguides is provided with at least one selected from an S-shaped waveguide having a predetermined radius of curvature, a linear portion, and a circular-arc portion having a predetermined radius of curvature and a circular-arc angle.

12. The arrayed waveguide-type wavelength multiplexing/demultiplexing device according to claim 2, wherein a neighborhood of at least one of said plurality of channel waveguides is provided with at least one selected from an S-shaped waveguide having are predetermined radius of curvature, a linear portion, and a circular-arc portion having a predetermined radius of curvature and a circular-arc angle.

13. The arrayed waveguide-type wavelength multiplexing/demultiplexing device according to claim 3, wherein a neighborhood of at least one of said plurality of channel waveguides is provided with at least one selected from an S-shaped waveguide having a predetermined radius of curvature, a linear portion, and a circular-arc portion having a predetermined radius of curvature and a circular-arc angle.

14. The arrayed waveguide-type wavelength multiplexing/demultiplexing device according to claim 4, wherein a neighborhood of at least one of said plurality of channel waveguides is provided with at least one selected from an S-shaped waveguide having a predetermined radius of curvature, a linear portion, and a circular-arc portion having a predetermined radius of curvature and a circular-arc angle.

15. The arrayed waveguide-type wavelength multiplexing/demultiplexing device according to claim 5, wherein said third neighborhoods of said input waveguides or said fourth neighborhoods of said output waveguides are formed to bend in a direction from a center waveguide of said plurality of channel waveguides to an outer waveguide.

16. An optical transmission apparatus having an optical signal output section for outputting a plurality of optical signals of different wavelengths and an arrayed waveguide-type wavelength multiplexing/demultiplexing device which merges the plurality of optical signals outputted from the optical signal output section to thus output wavelength-multiplexed light, the arrayed-type waveguide wavelength multiplexing/demultiplexing device comprising, on a substrate;

one or a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths, for separating the wavelength-multiplexed light, diffused by said first slab according to said plurality of wavelengths, into a plurality of separated lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either first neighborhoods of said respective channel waveguides to be connected to said first slab or second neighborhoods of said respective channel waveguides to be connected to said, second slab is set to become wider than a first waveguide interval in a first connection section for connecting said channel waveguide array to said first slab or a second waveguide interval in a second connection section for connecting said channel waveguide array to said second slab, said first or second neighborhood of at least one of said plurality of channel waveguides is formed from a plurality of waveguides having geometries of different degrees of flex for said respective channel waveguides, and curvature radii of respective S-shaped waveguides serving as said plurality of channel waveguides are made smaller from a center channel waveguide of said plurality of channel waveguides toward an outer channel waveguide.

17. An optical transmission apparatus having an optical signal output section for outputting a plurality of optical signals of different wavelengths and an arrayed waveguide-type wavelength multiplexing/demultiplexing device which merges the plurality of optical signals outputted from the optical signal output section to thus output wavelength-multiplexed light, the arrayed-type waveguide wavelength multiplexing/demultiplexing device comprising, on a substrate;

one or a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths, for separating the wavelength-multiplexed light, diffused by said first slab according to said plurality of wavelengths, into a plurality of separated lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either first neighborhoods of said respective channel waveguides to be connected to said first slab or second neighborhoods of said respective channel waveguides to be connected to said second slab is set to become wider than a first waveguide interval in a first connection section for connecting said channel waveguide array to said first slab or a second waveguide interval in a second connection section for connecting said channel waveguide array to said second slab, said first or second neighborhood of at least one of said plurality of channel waveguides is formed from a plurality of waveguides having geometries of different degrees of flex for said respective channel waveguides, and curvature radii of respective S-shaped waveguides serving as said plurality of channel waveguides are made smaller from a shortest channel waveguide toward a longest channel waveguide of said plurality of channel waveguides or from said longest channel waveguide toward said shortest channel waveguide.

18. An optical transmission apparatus having an optical signal output section for outputting a plurality of optical signals of different wavelengths and an arrayed waveguide-type wavelength multiplexing/demultiplexing device which merges the plurality of optical signals outputted from the optical signal output section to thus output wavelength-multiplexed light, the arrayed-type waveguide wavelength multiplexing/demultiplexing device comprising, on a substrate;

one or a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths, for separating the wavelength-multiplexed light, diffused by said first slab according to said plurality of wavelengths, into a plurality of separated lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either first neighborhoods of said respective channel waveguides to be connected to said first slab or second neighborhoods of said respective channel waveguides to be connected to said second slab is set to become wider than a first waveguide interval in a first connection section for connecting said channel waveguide array to said first slab or a second waveguide interval in a second connection section for connecting said channel waveguide array to said second slab, said first or second neighborhood of at least one of said plurality of channel waveguides is formed from a plurality of waveguides having geometries of different degrees of flex for said respective channel waveguides, and widths of respective S-shaped waveguides serving as said plurality of channel waveguides are narrow at a slab connection section corresponding to bases of said plurality of channel waveguides and become wider at circular-arc portions of said S-shaped waveguides facing said first or second slab toward a propagating direction of said wavelength-multiplexed light.

19. An optical transmission apparatus having an optical signal output section for outputting a plurality of optical signals of different wavelengths and an arrayed waveguide-type wavelength multiplexing/demultiplexing device which merges the plurality of optical signals outputted from the optical signal output section to thus output wavelength-multiplexed light, the arrayed-type waveguide wavelength multiplexing/demultiplexing device comprising, on a substrate;

one or a plurality of input waveguides for propagating and outputting wavelength-multiplexed light multiplexed with a plurality of wavelengths;

a first slab for diffusing said wavelength-multiplexed light outputted from said input waveguide;

a channel waveguide array, which has a plurality of channel waveguides of different lengths, for separating the wavelength-multiplexed light, diffused by said first slab according to said plurality of wavelengths, into a plurality of separates lights and causing said separated lights to propagate;

a second slab for condensing said plurality of separated lights having propagated through said channel waveguide array; and one or a plurality of output waveguides for causing said lights condensed by said second slab to propagate, wherein a waveguide interval in at least either first neighborhoods of said respective channel waveguides to be connected to said first slab or second neighborhoods of said respective channel waveguides to be connected to said second slab is set to become wider than a first waveguide interval in a first connection section for connecting said channel waveguide array to said first slab or a second waveguide interval in a second connection section for connecting said channel waveguide array to said second slab, said first or second neighborhood of at least one of said plurality of channel waveguides is formed from a plurality of waveguides having geometries of different degrees of flex for said respective channel waveguides, and widths of respective S-shaped waveguides serving as said plurality of channel waveguides achieved in a slab connection section corresponding to bases of said plurality of channel waveguides become equal to widths of said S-shaped waveguides other than said slab connection section.

* * * * *

UNITED STATES PATENT AND TRADEMARK OFFICE
CERTIFICATE OF CORRECTION

PATENT NO. : 6,985,657 B2  
APPLICATION NO. : 11/064482  
DATED : January 10, 2006  
INVENTOR(S) : Goji Nakagawa Page 1 of 1

It is certified that error appears in the above-identified patent and that said Letters Patent is hereby corrected as shown below:

Column 22,  
Line 17, delete "wave guide" and insert -- waveguide --.  
Lines 18-19, delete ", wave wide" and insert -- waveguide --.

Column 24,  
Line 27, after "said" delete ",".

Signed and Sealed this

Twentieth Day of June, 2006

JON W. DUDAS  
*Director of the United States Patent and Trademark Office*